(12) United States Patent
Lancuba

(10) Patent No.: US 12,235,207 B2
(45) Date of Patent: Feb. 25, 2025

(54) MULTIPASS CELL

(71) Applicant: THERMO FISHER SCIENTIFIC (ECUBLENS) SARL, Ecublens (CH)

(72) Inventor: Patrick Lancuba, Fitchburg, WI (US)

(73) Assignee: Thermo Fisher Scientific (Ecublens) SARL, Ecublens (CH)

( * ) Notice: Subject to any disclaimer, the term of this patent is extended or adjusted under 35 U.S.C. 154(b) by 21 days.

(21) Appl. No.: 17/906,387

(22) PCT Filed: Mar. 18, 2021

(86) PCT No.: PCT/EP2021/056971
§ 371 (c)(1),
(2) Date: Sep. 15, 2022

(87) PCT Pub. No.: WO2021/185977
PCT Pub. Date: Sep. 23, 2021

(65) Prior Publication Data
US 2023/0125832 A1 Apr. 27, 2023

(30) Foreign Application Priority Data

Mar. 18, 2020 (GB) ..................... 2003949

(51) Int. Cl.
*G01N 21/03* (2006.01)
*G01J 3/02* (2006.01)
(Continued)

(52) U.S. Cl.
CPC .......... *G01N 21/031* (2013.01); *G01J 3/0291* (2013.01); *G01J 3/42* (2013.01); *G01N 21/55* (2013.01); *G01N 2021/551* (2013.01)

(58) Field of Classification Search
CPC .... G01J 3/0291; G01J 3/42; G01N 2021/551; G01N 21/031; G01N 21/55
See application file for complete search history.

(56) References Cited

U.S. PATENT DOCUMENTS

| 4,322,621 A | 3/1982 | Aagard |
| 4,657,397 A | 4/1987 | Oehler et al. |

(Continued)

FOREIGN PATENT DOCUMENTS

| CN | 103278472 B | 1/2016 |
| CN | 109477760 A | 3/2019 |

(Continued)

OTHER PUBLICATIONS

Ahmed R., et al., "A Comparative Study of Single and Double Pulse Laser Induced Breakdown Spectroscopy," Journal of Applied Physics, 2009, vol. 106, 033307, 8 pages.

(Continued)

*Primary Examiner* — Hina F Ayub
(74) *Attorney, Agent, or Firm* — William R. McCarthy, III

(57) ABSTRACT

A multipass cell (300) comprising: a first reflector arrangement (305A, 305B); and a second reflector arrangement (307), the first (305A, 305B) and second (307) reflector arrangements defining an optical cavity (315) therebetween and the cell; wherein the first reflector arrangement (305A, 305B) is configured such that light incident on the first reflector arrangement (305A, 305B) is at least partially retroreflected towards the second reflector arrangement (307), wherein the second reflector (307) arrangement comprises a concave surface that is reflective, wherein at least one of the first (305A, 305B) and second (307) reflector arrangements comprises an aperture (306) for allowing light to enter and/or exit the optical cavity (315).

32 Claims, 18 Drawing Sheets

(51) Int. Cl.
*G01J 3/42* (2006.01)
*G01N 21/55* (2014.01)

(56) References Cited

U.S. PATENT DOCUMENTS

| | | | |
|---|---|---|---|
| 5,751,472 | A | 5/1998 | Jeys et al. |
| 5,767,976 | A * | 6/1998 | Ankerhold ......... G01N 21/3504 356/438 |
| 6,577,398 | B1 * | 6/2003 | Ducellier ........... G02B 6/29358 356/519 |
| 8,299,433 | B2 * | 10/2012 | Majewski ............ G01N 21/031 250/336.1 |
| 10,041,781 | B1 | 8/2018 | Tucker |
| 2003/0227681 | A1 | 12/2003 | Currie |
| 2011/0249698 | A1 | 10/2011 | Hertwig et al. |
| 2016/0202175 | A1 | 7/2016 | Sawyers et al. |
| 2019/0316965 | A1 * | 10/2019 | Kobayashi .............. G01J 3/021 |

FOREIGN PATENT DOCUMENTS

| | | |
|---|---|---|
| DE | 102016113049 A1 | 1/2018 |
| EP | 1621867 B1 | 10/2009 |
| EP | 1949077 B1 | 12/2010 |
| GB | 2517187 A | 2/2015 |
| JP | S573031 A | 1/1982 |
| JP | 2002323442 A | 11/2002 |
| JP | 2008026229 A | 2/2008 |
| JP | 2015155848 A | 8/2015 |
| JP | 2017187468 A | 10/2017 |
| JP | 2019066396 A | 4/2019 |
| WO | WO-9209877 A2 | 6/1992 |
| WO | WO-2014049358 A1 | 4/2014 |
| WO | WO-2017060853 A1 | 4/2017 |
| WO | WO-2018164274 A1 | 9/2018 |

OTHER PUBLICATIONS

Borysow J., et al., "Laser Multipass System with Interior Cell Configuration," Applied Optics, Oct. 2011, vol. 50, No. 30, pp. 5812-5815.

Graf M., et al., "Compact, Circular, and Optically Stable Multipass Cell for Mobile Laser Absorption Spectroscopy," Optics Letters, Jun. 1, 2018, vol. 43, No. 11, pp. 2434-2437.

Hirlimann C., et al., "Femtosecond Jet Laser Preamplifier," Optics Communications, Aug. 1, 1986, vol. 59, No. 1, pp. 52-54.

Kasyutich V.L., et al., "Multipass Optical Cell Based Upon two Cylindrical Mirrors for Tunable Diode Laser Absorption Spectroscopy," Applied Physics B, 2007, vol. 88, pp. 125-130.

Korner J., et al., "Compact Aberration-Free Relay-Imaging Multi-Pass Layouts for High-Energy Laser Amplifiers," Applied Sciences, 2016, vol. 6, No. 353, 18 pages.

Mohamed T., et al., "Multipass Cell Based on Confocal Mirrors for Sensitive Broadband Laser Spectroscopy in the Near Infrared," Applied Optics, 2013, vol. 52, No. 29, pp. 7145-7151.

Noll R., "Laser-Induced Breakdown Spectroscopy," Springer, 2012, pp. 7-15.

PCT/EP2021/056971, International Search Report and Written Opinion, Jun. 7, 2021, 15 pages.

Robert C., "Simple, Stable, and Compact Multiple-Reflection Optical Cell for Very Long Optical Paths," Applied Optics, 2007, vol. 46, No. 22, pp. 5408-5418.

Silver J.A., "Simple Dense-Pattern Optical Multipass Cells," Applied Optics, 2005, vol. 44, No. 31, pp. 6545-6556.

Stratis D.N., et al., "Effect of Pulse Delay Time on a Pre-ablation Dual-Pulse LIBS Plasma," Applied Spectroscopy, 2001, vol. 55, No. 10, pp. 1297-1303.

White J.U., "Very Long Optical Paths in Air," Journal of Optical Society of America, 1976, vol. 66, No. 5, pp. 411-416.

\* cited by examiner

MULTIPASS CELL

CROSS-REFERENCE TO RELATED APPLICATIONS

This application is a 371 national phase of International application no. PCT/EP2021/056971 filed Mar. 18, 2021, which claims priority to GB application no. 2003949.1 filed Mar. 18, 2020, which disclosures are herein incorporated by reference in their entirety.

FIELD

The present disclosure relates generally to multipass cells and to the use of such multipass cells in absorption spectrometry, optics and laser fabrication.

BACKGROUND

Multipass cells are used to provide optical cavities that cause light within the cavity to traverse a desired total optical path length. Mirrors or other reflective surfaces of the cell are used to redirect light at reflection points and an arrangement of such reflective surfaces can be used to confine light within a defined space (e.g. a volume enclosed by the reflective surfaces) and to cause the light to travel along a controlled path before exiting the optical cavity.

A common application of multipass cells is absorption spectroscopy, which is used for determining the concentrations of absorbing species within a gaseous or liquid medium. Absorption spectroscopy is a non-destructive technique that relies on absorption of light by atoms and/or molecules at a particular wavelength. In this process, the energy of a photon is absorbed by the electrons or the atoms and/or molecules in matter. Optical techniques are used to analyse the attenuated light that has passed through the sample. Depending on the energy of absorbed photons (which will depend on the specific absorption characteristics of the sample under analysis), ultraviolet, visible, or infrared absorption spectroscopy methods are used. A spectrophotometer may be used to measure absorbance of a sample quantitatively. Characterisation of the transmitted spectrum allows for determination of the concentration of a substance, kinetic measurements of certain chemical or biochemical reactions, and identification of some chemical or biological species.

The absorption of light of transmitted intensity $I(\lambda,x)$ at wavelength $\lambda$ as a function of the distance travelled, x, is given by the Beer-Lambert law:

$$I(\lambda,x)=I_0(\lambda)\exp(-\alpha(\lambda)x) \quad \text{Equation (1)}$$

The absorption by a gas, or a liquid species within a solution, depends on the absorption coefficient $\alpha(\lambda)$ (which itself depends on the concentration of the absorbing medium) and the distance x (hereafter referred to as optical path length) travelled by the light through the absorbing medium. The absorption coefficient $\alpha(\lambda)$ is an intrinsic property of the chemical species and depends on the electronic, vibrational or rotational line absorption of the atom or molecule under consideration. Most chemical species possess a set of absorption transition bands across the electromagnetic spectrum.

The light sources necessary to drive these transitions often are not commercially available or are very expensive. The majority of the inexpensive light sources are only available for a narrow visible-near infrared portion of such spectrum, where several chemical species possess only weak absorption atmospheric transition bands. For example, gas species such as water, or diatomic molecules such as oxygen, possess weak absorption transitions in the visible and near-infra-red (vis-nir) part of the spectrum. These absorption transitions are therefore not very sensitive to light changes, which makes the detection of low concentrations very challenging.

For a given $\alpha(\lambda)$, the sensitivity of the absorption can be varied by changing the optical path length, as this changes the interaction time of the emitted light with the species under analysis. Longer optical path lengths therefore result in better sensitivity and lower detection limits. Nevertheless, increasing the optical path length on a straight line between light source and detection system (a so called-single pass system) is not a practical solution when optical path lengths on the order of several metres are desired.

Multipass cells are known tools for absorption spectroscopy that are used in order to increase the total optical path length and therefore the sensitivity of absorption spectrometry measurements. The first multipass cell design was proposed and demonstrated by White in 1942 and is referred to as a White cell. A White cell is shown in FIG. 1. A further type of multipass cell is the Herriott cell, which was proposed in 1965, and which is shown in FIG. 2. Both of these cells comprise opposing, concave reflecting surfaces.

There are several drawbacks to prior art multipass cells. The stability of the optical components in a White cell is of the order of microradians, which makes the White cell sensitive to vibrations and mechanical misalignment. The Herriott cell is more stable than the White cell, but it does not accept very high numerical beam apertures and the achievable optical path length is limited. Moreover, a disadvantage of some Herriott systems lies in the high price of the components used and the difficulty associated with optical alignment. Furthermore, Herriott cell types rely on creating apertures in mirrors (for input and exit of the traversing light), which represents an additional industrial step adding a considerable increase in the total cost of the optical setup. It is therefore an object of this disclosure to address these and other problems with prior art multipass cells.

SUMMARY

Against this background and in accordance with a first aspect, there is provided a multipass cell according to claim 1. Also provided are apparatus using the multipass cells of the disclosure. For example, an absorption spectrometer according to claim 30, a pre-amplifier for a laser according to claim 31, and a laser according to claim 32 are provided.

The present disclosure relates to a multipass cell that is highly stable and relatively inexpensive to manufacture. The multipass cell can be used for absorption spectroscopy but can also be used in various other fields. The cell has an optical cavity and can provide an optical path length of up to or greater than 50 or 100 metres. The disclosure provides an optical structure that can be fabricated using inexpensive, commercially available components and which exhibits remarkable mechanical tolerances that make it suitable to withstand vibrations and simplify mechanical alignment in industrial implementations.

Some of the multipass cells of the disclosure are based on the combination of two prism mirrors and a concave (e.g. spherical) mirror, which respectively serve as two ends of a multipass cell. The prisms define a first end and the concave mirror defines a second opposing end. Light can enter through one end of the cell (typically between the prisms)

and bounce repeatedly between the first and second ends of the cell. The optical properties of the combination of two prisms leads to enhanced stability compared to existing multipass cells. For instance, because the prisms are arranged to have perpendicular surfaces, light that is reflected by the concave mirror towards the prisms is at least partially retroreflected by the prisms. Therefore, the spreading of light as it repeatedly traverses the cell can be reduced. Although in principle, divergence of light could occur due to slight misalignment of the optical system, imperfections in the surface of the prisms and/or imperfections in the waveform of the light that enters the cell, in the presently described multipass cells, the partially retroreflective end of the cell is less sensitive to these imperfections and so their effects are reduced.

The advantage of improved stability due to reduced spreading of light can also be achieved using three mutually perpendicular reflective surfaces (e.g. a corner reflector). The use of a partially (or fully) retroreflective end of the cell is particularly advantageous in combination with a concave (e.g. a focusing) reflector at the other end of the cell.

The multipass cells of the disclosure provide additional benefits. For instance, whilst perpendicular reflective surfaces can be provided using, for example, two mirrors, the combination of two prisms (and especially two prims whose cross sections are right-angled isosceles triangles) is particularly advantageous. Two right-angled isosceles triangular prisms can be positioned side-by side (resting on the face defined by the hypotenuse of the cross section, with the axes of the prisms parallel) such that they define a pair of perpendicular surfaces. Moreover, by positioning the prisms with a small slit between their edges (the edges that are parallel with the axes of the prisms), an aperture for allowing light to pass between the prisms can easily be provided. Triangular prisms are widely available optical components that are easy to arrange precisely (e.g. using a mounting structure) to provide the above-noted advantages and which provide a larger surface area for mounting within an optical arrangement, improving stability of the reflective surface. Therefore, prisms provide an efficient and reliable means for manufacturing a pair of perpendicular reflective surfaces.

The enhanced stability provided by the reflector arrangements of the disclosure allow the cells to provide extremely long optical path lengths (and hence also long durations of time during which light is within the cell) for any given separation between the reflectors. For instance, the separation between the ends of the cell can be adjusted and the angle at which light enters the cell can be adjusted. By changing these properties of the cell's geometry, the total path traversed by light within the cell can be adjusted from less than 1 m up to tens of metres or even greater than 100 m. This can provide relatively long path lengths for absorption spectrometry analysis and can be used to provide temporal delays between pulses in double-pulse laser systems. In general terms, greater separations between the ends of the cell lead to greater path lengths and increased path lengths can also be achieved by increasing the angle at which the light enters the cell (i.e. by entering the light at greater angle from the longitudinal axis of the cell).

The degree of control over the optical path length and the stability provided by the cells of this disclosure are useful in various contexts, including in absorption spectrometry, where long optical path lengths help to achieve significant absorption peaks from a sample. The cells are also advantageous in the context of double-pulse systems, as the cells can be used to introduce relatively long delays between laser pulses. Such double-pulse systems may be used in, for example, double-pulse laser induced breakdown spectroscopy (LIBS), avoiding the need for complex electronics or multiple lasers to provide double laser pulses with a sufficiently long temporal delay.

LISTING OF FIGURES

Prior art multipass cells and embodiments of the disclosure will now be described, by way of example only, with reference to the accompanying drawings in which.

DETAILED DESCRIPTION

Figure 1:
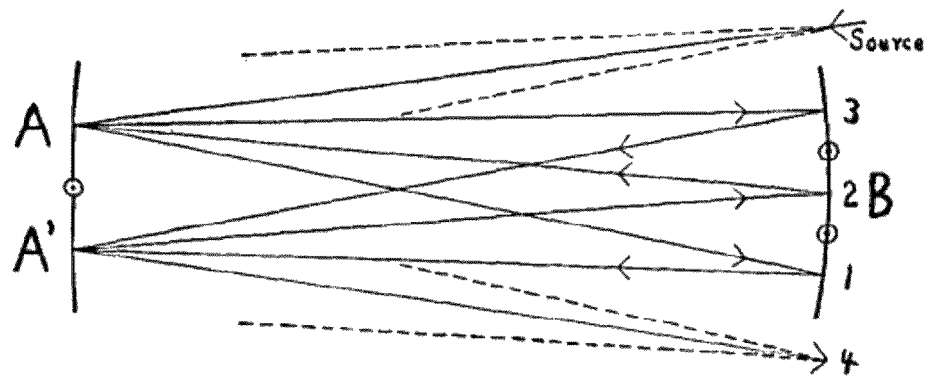
FIG. 1 shows schematically a prior art White cell.

FIG. 1 shows a prior art White cell. A White cell comprises a set of three spherical mirrors, A, A' and B, that have the same radius of curvature. Mirrors A and A' are positioned adjacent one another and each face mirror B. The entering and exiting of the beam occurs externally to the cell, as shown in FIG. 1, which makes it possible to incorporate a White cell with an external coherent laser beam.

FIG. 1 shows a range of different paths that the light may traverse between the mirrors A, A' and B, before exiting the White cell towards position 4. The directions of the arrows on the ray paths show incident and reflected rays. The optical path length traversed by light in a White cell depends on which of the depicted paths is traversed. Clearly, the distance between the mirrors A, A' and B will affect the optical path length traversed by light within the cell. Moreover, the number of times light is reflected within the cell will affect the optical path length.

The number of traversals can be changed by making rotational adjustments to either A or A', which changes the specific path that light takes through the cell. In the White cell configuration shown in FIG. 1, light enters at the source and is reflected from mirror A towards mirror B, upon which it incident at position 1 or 3. Light incident at positions 1 and 3 is reflected to mirror A', where it is reflected once again. The light reflected from mirror A' may follow two paths, as shown in FIG. 1. Light may be reflected from mirror A' towards position 4 and hence leave the cell. Alternatively, light may be reflected from mirror A' back towards mirror B and traverse another circuit within the mirror arrangement. In this case, light is reflected towards position 2 on mirror B, then towards mirror A, then towards mirror B, then towards mirror A'. Once the light returns to mirror A', the light may leave the cell towards position 4 or may repeat the process to traverse the mirror arrangement one or more times.

White cells are available with path lengths ranging from less than a meter to hundreds of metres. However, as noted previously, the White cell arrangement depicted in FIG. 1 is sensitive to vibrations and mechanical misalignment. Minor misalignment between any of the three mirrors may cause the light not to leave the cell in the desired direction, or not to leave the cell at all.

Figure 2:
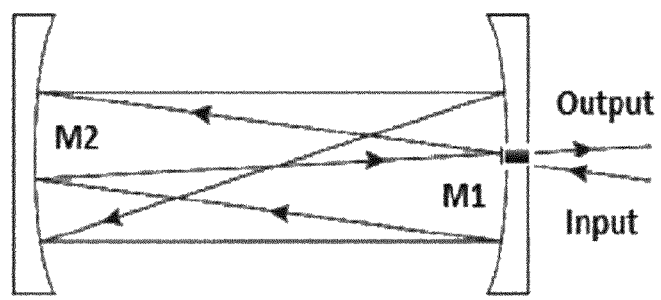
FIG. 2 shows schematically a prior art Herriott cell.

In FIG. 2, a Herriott cell is depicted that comprises two mirrors, M1 and M2. The mirrors M1 and M2 are parallel, spherical mirrors, with one of the mirrors possessing a circular aperture (which may be on-axis or off-axis) that allows the beam to enter and exit the cell, as shown by the labels "Input" and "Output". Input light is directed towards and incident upon mirror M2, which reflects light back towards mirror M1. Mirror M1 then reflects the light towards M2, which reflects light back towards M1, then back towards M2, before finally being reflected back towards the aperture where it is output. The distance between the mirrors M1 and M2 will affect the optical path length traversed by light within the cell. The curvature of the mirrors and the spacing between the mirrors dictates the path within the cell that the light traverses.

An alternative Herriott cell uses two astigmatic mirrors possessing a relative angle between them, allowing the reflections to span ellipses onto the mirror surface, making more effective use of the total mirror surface and therefore increasing the optical path length. One of the mirrors again possesses a central circular aperture to allow the beam to enter and exit from the cell.

As noted previously, the Herriott cell is more stable than the White cell, but it cannot accept very high numerical beam apertures and the optical path length is limited. Moreover, astigmatic mirrors are expensive and difficult to align. Additionally, mirrors with apertures are not standard optical components, so creating a central or off-axis aperture in a mirror adds complexity and cost to the manufacture of a multipass cell. Thus, there is a need for improvements to such prior art multipass cells.

In contrast to such existing multipass cells, the present disclosure provides, in generalised terms, a multipass cell comprising: a first reflector arrangement; and a second reflector arrangement; wherein the first reflector arrangement is configured such that light incident on the first reflector arrangement is at least partially retroreflected towards the second reflector arrangement. Advantageously, the use of a reflector arrangement that is at least partially retroreflective provides the effect of improved mechanical stability, because a partially retroreflective surface inhibits scattering of light incident thereon and so light is reflected back to its source with reduced or minimum scattering. In this case, light is reflected from the first reflector arrangement towards the second reflector arrangement, which allows the multipass cell of this disclosure to tolerate more mechanical misalignment than prior art devices, which cannot tolerate significant misalignment.

The first reflector arrangement of the present disclosure may be defined in alternative terms based on its structure rather than its partial retroreflectivity. For example, the first reflector arrangement may be defined as having two perpendicular (or substantially perpendicular so as to provide partial retroreflectivity) reflective surfaces or three mutually perpendicular (or substantially perpendicular so as to provide retroreflectivity) reflective surfaces. A planar mirror reflects light incident thereon back to its source only when the light is exactly perpendicular to the mirror, having a zero angle of incidence. Whilst laser light exhibits a low degree of beam (or pulse) divergence, no laser beam is perfectly collimated. Moreover, no mirror is perfectly planar. Therefore, for real light sources, some scattering from a planar mirror typically occurs. Thus, in the context of this disclosure, a planar mirror is not considered to be partially retroreflective. Rather, in the context of this disclosure, a reflector arrangement is at least partially retroreflective if it provides a retroreflective action for light across a range (i.e. a plurality) of angles of incidence (unlike a perfectly planar mirror, which can only retroreflect light incident at a single angle of incidence).

Retroreflectivity can be obtained using a corner reflector, which comprises three perpendicular planar reflectors that cause any light incident into the corner reflector to be retroreflected to its source. Partial retroreflectivity can also be achieved using only two perpendicular planar mirrors and in this case, light incident from a range of directions will be retroreflected. However, the lack of a third reflective surface means that light having a component in the direction defined by the line of intersection of the two planes will not be perfectly retroreflected to its source. Rather, two planar perpendicular mirrors are retroreflective for light that is perpendicular to the direction defined by the intersection of the two planes.

A first embodiment of a multipass cell 300 is depicted in FIGS. 3A, 3B, 3C and 3D, which show schematically the multipass cell 300 in four different configurations. The multipass cell 300 of FIGS. 3A to 3D is configured for absorption spectrometry.

Figure 3A:
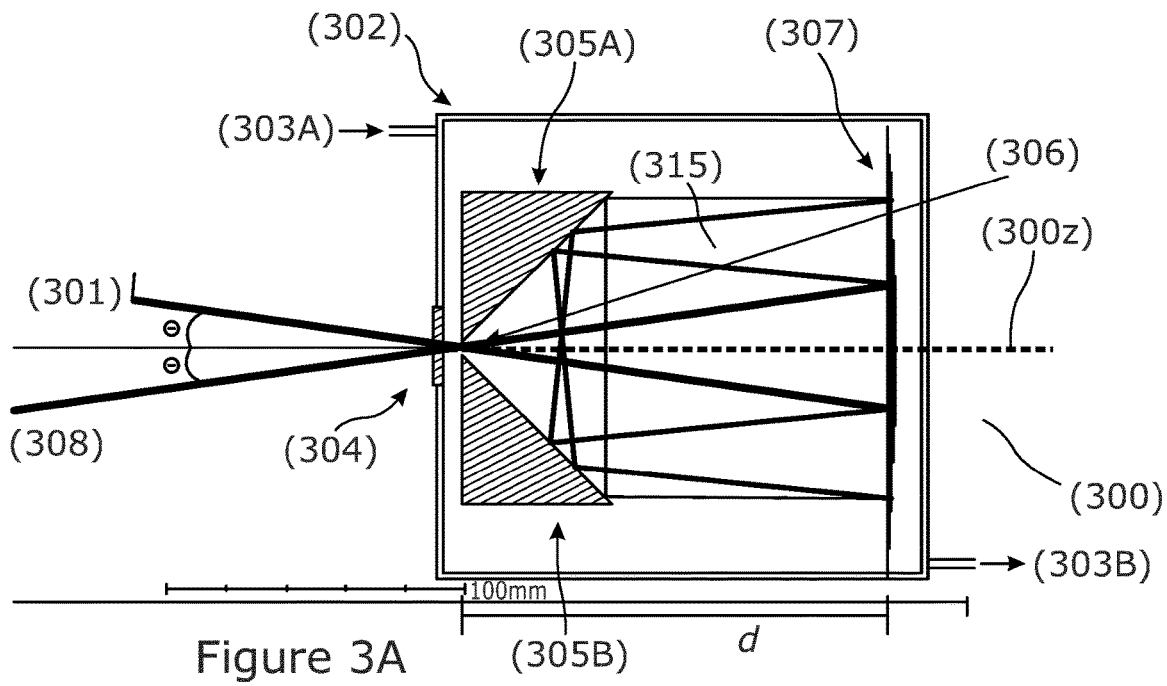
FIGS. 3A to 3D show schematically a multipass cell according to a first embodiment.

The multipass cell 300 comprises a housing in the form of a sealed container 302 to contain a gaseous sample to be analysed. The container 302 has entry 303a and exit 303b points as shown, which act as an inlet and outlet for a sample respectively. Light 301, which could be coherent light (e.g. light generated by a laser) enters the container 302 through an optical window 304, which is transparent to the selected wavelength of the light source. The light 301 is directed at an incoming entry angle $\Theta$ with respect to the normal to the surface of the window 304. The angle $\Theta$ is also the angle between the direction of the light 301 and the longitudinal axis 300z of the cell. The longitudinal axis 300z is shown in FIG. 3A but is omitted from FIGS. 3B, 3C and 3D for simplicity. The angle $\Theta$ is typically from 2° to 10° (although other ranges of angles can be used).

The multipass cell 300 comprises first and second reflector arrangements 305 and 307. The reflector arrangements 305 and 307 are arranged such that light entering the multipass cell 300 is repeatedly reflected between the two arrangements (without being reflected from any surfaces other than the surfaces of the two reflector arrangements) and the reflector arrangements 305 and 307 define an optical cavity 315.

The first reflector arrangement 305 comprises two prism mirrors 305A, 305B positioned such that a small slit 306, which is typically 2 to 10 mm wide, is defined between the prisms 305A and 305B. The first reflector arrangement comprises two surfaces (faces of the two prisms) that are substantially perpendicular. The slit 306 is aligned with the window 304 and serves as an aperture through which a beam or pulse of light can enter and exit an optical cavity 315 defined within the multipass cell 300.

The second reflector arrangement 307 of this embodiment is a spherical, circular mirror, which is positioned at a distance d from the prism mirrors 305A and 305B. In this embodiment, the second reflector arrangement 307 does not have an aperture and so light cannot pass through the second reflector arrangement. The second reflector arrangement 307 faces the prisms 305A and 305B of the first reflector arrangement.

In use, light 301 enters the cell through the optical window 304 and the slit 306 between the prisms 305A and 305B. The light then reflects from the spherical mirror 307, which reflects and focuses the light back towards the first reflector arrangement 305. The light reflects from one of prisms 305A and 305B to the other of the prisms 305A and 305B and, because the prisms 305A and 305B are positioned such that their faces are perpendicular, the light is retroreflected by the combination of the two prisms back towards the spherical mirror 307. The symmetry of the reflector arrangements 305 and 307 causes the light to follow a specific path within the cell 300 and this path is remarkably stable with respect to misalignment. After a number of reflections within the optical cavity 315, the path of the light is eventually incident upon the slit 306 between the prisms and so the light 308 emerges from the cell 300. When the optical cavity 315 is viewed in cross-section (in the plane perpendicular to the axes of the prisms 305A and 305B; or equivalently in the plane whose normal vector is the line of intersection of the planar reflecting surfaces of prisms 305A and 305B), the angle Θ at which the light 308 emerges from the cell 300 is equal (but in the opposite direction) to the angle at which the light 301 enters the cell 300.

Hence, the combination of the two prism mirrors 305A and 305B and the spherical mirror 307 defines a set of standing modes that can trap light within the cell 300 for a number of reflections before exiting the cavity 315 along the exit direction of the light 308. The number of reflections and consequently the total achievable optical path length within the multipass cell 300 depends on a number of factors including: the surface areas of the prism mirrors 305A, 305B; the radius of curvature of the spherical mirror 307; the angle at which the light 301 enters the cavity 315; and the distance, d, between the prism mirrors 305A, 305B and the spherical mirror 307. Thus, the optical path length depends on the geometrical characteristics of the setup. However, the optical path length is not affected by the physical characteristics of the light (including wavelength, beam energy per unit area, or whether the light 301 is pulsed or continuous-wave).

Figure 3B:
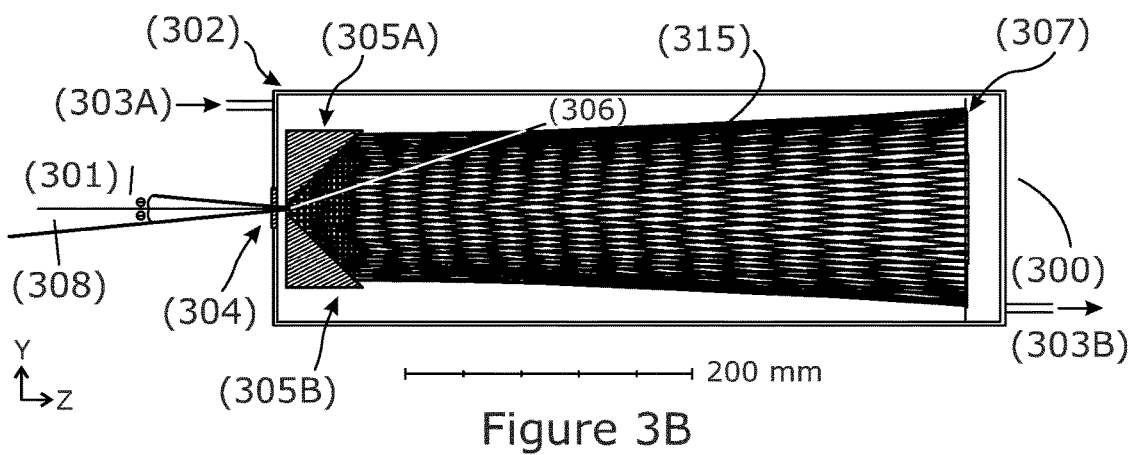
Figure 3C:
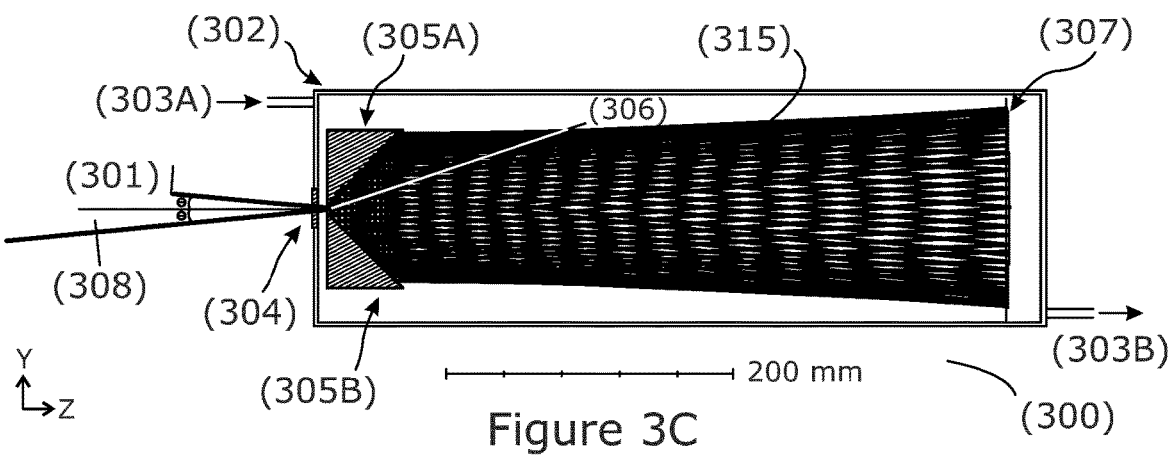

The effects of the geometry on the optical path length are shown in FIGS. 3A to 3D, which depict simulated ray traces for different configurations. In FIG. 3A, the separation between the first and second reflector arrangements 305 and 307 is d=150 mm. This is the distance between the centre of the aperture between the two prism mirrors 305A and 305B and the spherical mirror 307. This arrangement leads to 8 reflections and a total optical path length of 1.2 m. In FIG. 3B, the distance d is increased to 485 mm, leading to 66 reflections and a total optical path length of 31.9 m. In FIG. 3C, the distance d has been further increased to 525 mm, leading to 88 reflections and a total optical path length of 46.3 m. The angles of incidence in FIGS. 3B and 3C are the same as in FIG. 3A.

Figure 3D:
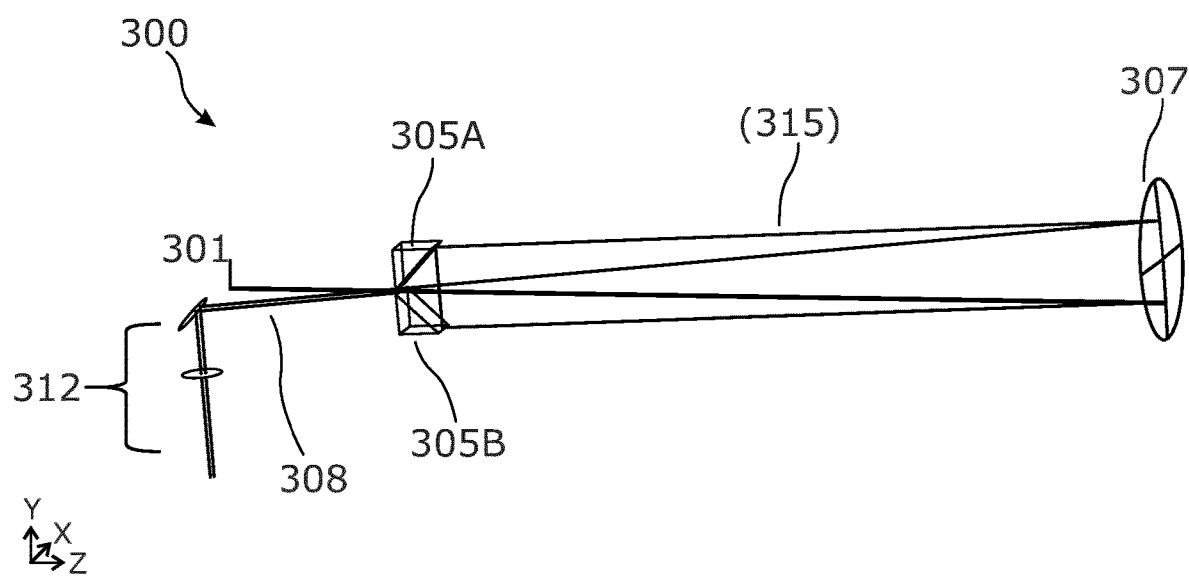

FIG. 3D shows a special case for the multipass cell 300 in which the distance d is equal to exactly half of the focal length of the second reflector arrangement 307 (which in this case is a circular mirror). It can be seen that in this arrangement, the incident light 301 passes through the first reflector arrangement 305 and strikes the second reflector arrangement 307, before being reflected back towards the first reflector arrangement 305. The first reflector arrangement 305 then partially retroreflects the light back towards the second reflector arrangements and, due to the high degree of symmetry of this configuration, the light returns to the centre of the first reflector arrangement where it emerges from the optical cavity 315 along the direction of the exiting light 308. Ensuring that the first and second reflector arrangements 305 and 307 are separated by half the focal length of the second reflector arrangement 307 causes the light to traverse the length of the cell 300 exactly four times.

FIG. 3D is simplified and omits the housing of the FIGS. 3A, 3B and 3C. However, FIG. 3D further illustrates an optical arrangement 312 for guiding the light 308 emerging from the cell 300 to a desired destination (e.g. a detector, which optionally may include a spectrograph allowing detection of the light as a function of its wavelengths). In this case, the optical arrangement 312 comprises a mirror and a lens, but various combinations of optical elements may be used to direct light to a desired destination.

The embodiment of FIGS. 3A to 3D therefore provides a novel multipass cell 300 architecture based on the combination of two prism mirrors 305A and 305B and a concave spherical mirror 307. It can be seen from these figures that a wide range of optical path lengths are achievable. This architecture may be used for absorption spectroscopy and may provide an optical path length of up to or greater than 50 metres (equivalent to a temporal delay of approximately 167 ns).

Figure 4A:
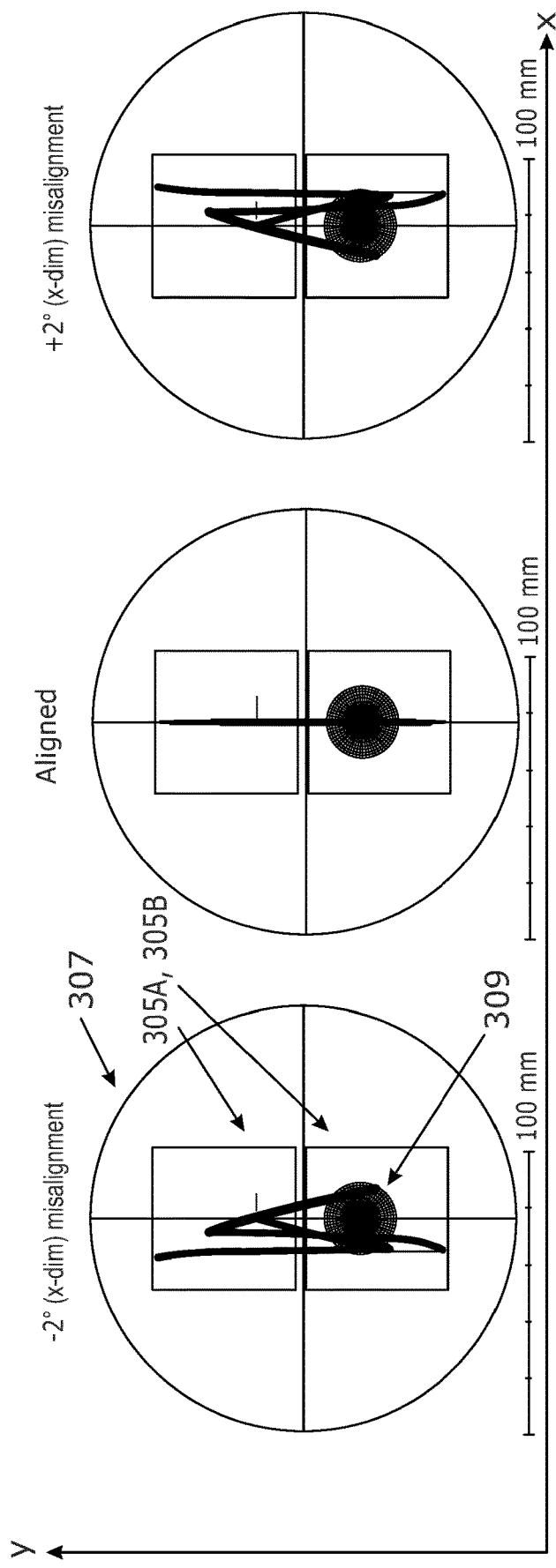
FIGS. 4A to 4C show stability analysis of the multipass cell of the first embodiment.
Figure 4B:
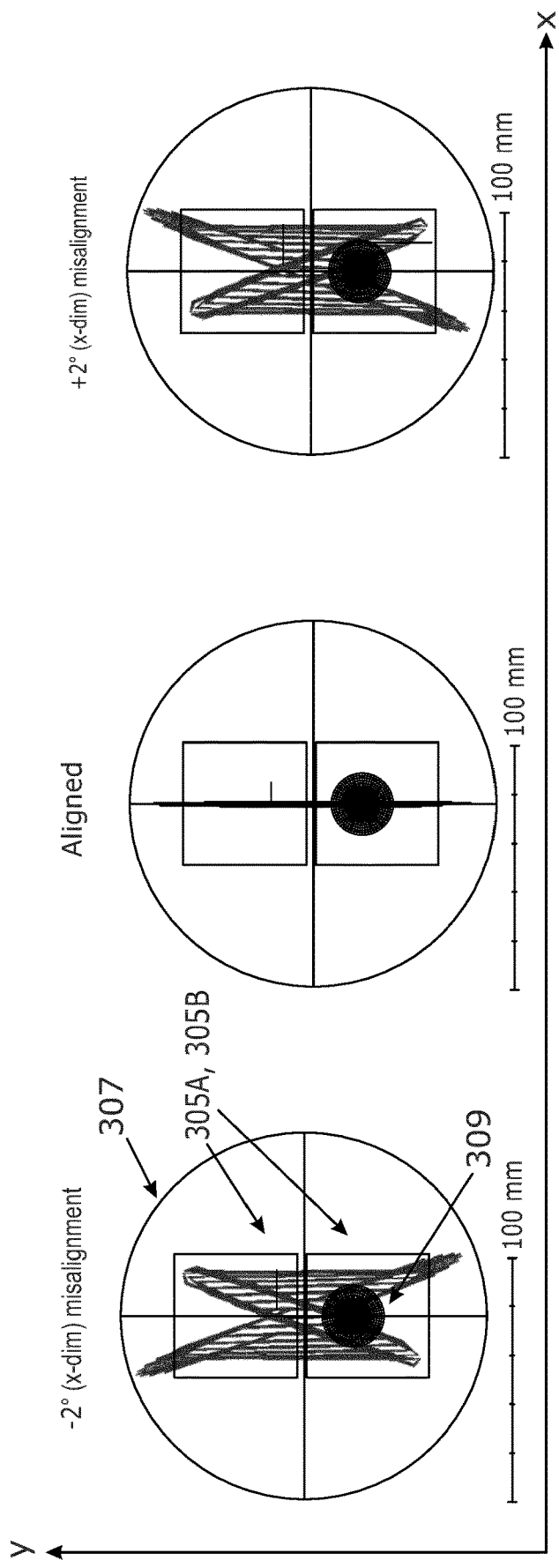
Figure 4C:
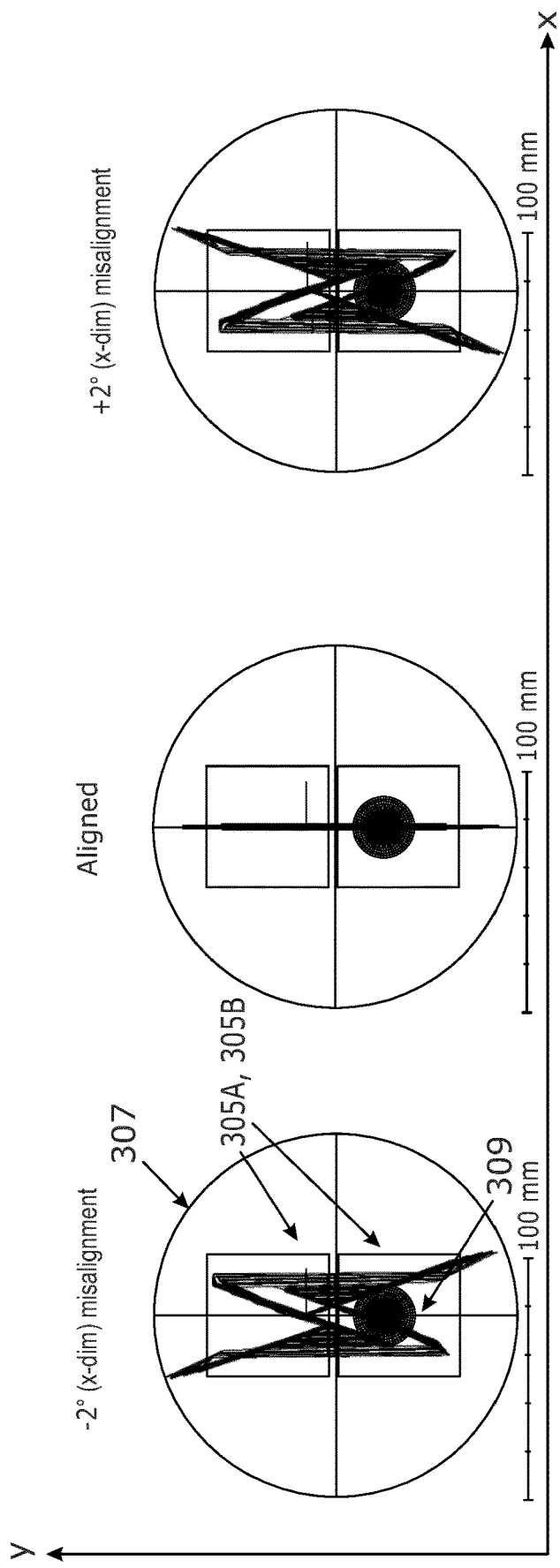

FIGS. 4A, 4B and 4C depict simulations of the multipass cell 300 of FIGS. 3A to 3D when slightly misaligned. As noted previously, an advantage provided by embodiments of this disclosure is the increased stability when up to 4° of misalignment between the reflector arrangements is present. This can be demonstrated by studying the effects of controlled misalignment on the optical path traced by a coherent light beam.

Each of FIGS. 4A, 4B and 4C is composed of 3 subfigures outlining a different misalignment scenario. FIG. 4A shows a stability study of the multipass cell for the geometry presented in FIG. 3A, with a separation between the reflector arrangements 305 and 307 of d=150 mm. FIG. 4B is a stability study of the multipass cell for the geometry presented in FIG. 3B, with a separation between the reflector arrangements 305 and 307 of d=485 mm. FIG. 4C is a stability study of the multipass cell for the geometry presented in FIG. 3C, with a separation between the reflector arrangements 305 and 307 of d=525 mm.

In each case, the central subfigure corresponds to a well-aligned laser beam that follows an optical path on a single plane by creating standing modes between the prism mirrors 305A and 305B and the spherical mirror 307. For the stability analysis depicted in FIGS. 4A to 4C, the exiting beam is collected onto a detection system 309.

When the beam is misaligned in the x-dimension from −2° (left subfigure) to +2° (right subfigure), the optical path is no longer confined to a single plane and can span the entire volume between the prism mirrors 305A and 305B and the spherical mirror 307. The geometry proposed in this embodiment allows the integrity of the standing modes to be maintained under misalignment, which means the beam may successfully exit the cell 300 even under severe misalignment conditions. In each of FIGS. 4A, 4B and 4C, a beam with an incoming misalignment angle of up to 4° in the x-dimension −2° to +2°) is shown. This results in the optical path being tilted with respect to the aligned case, where all reflections lie on a single plane. Within these boundaries, the beam is nevertheless able to create standing modes within the multipass cell and successfully exit for detection at a detection system 309.

Figure 5:
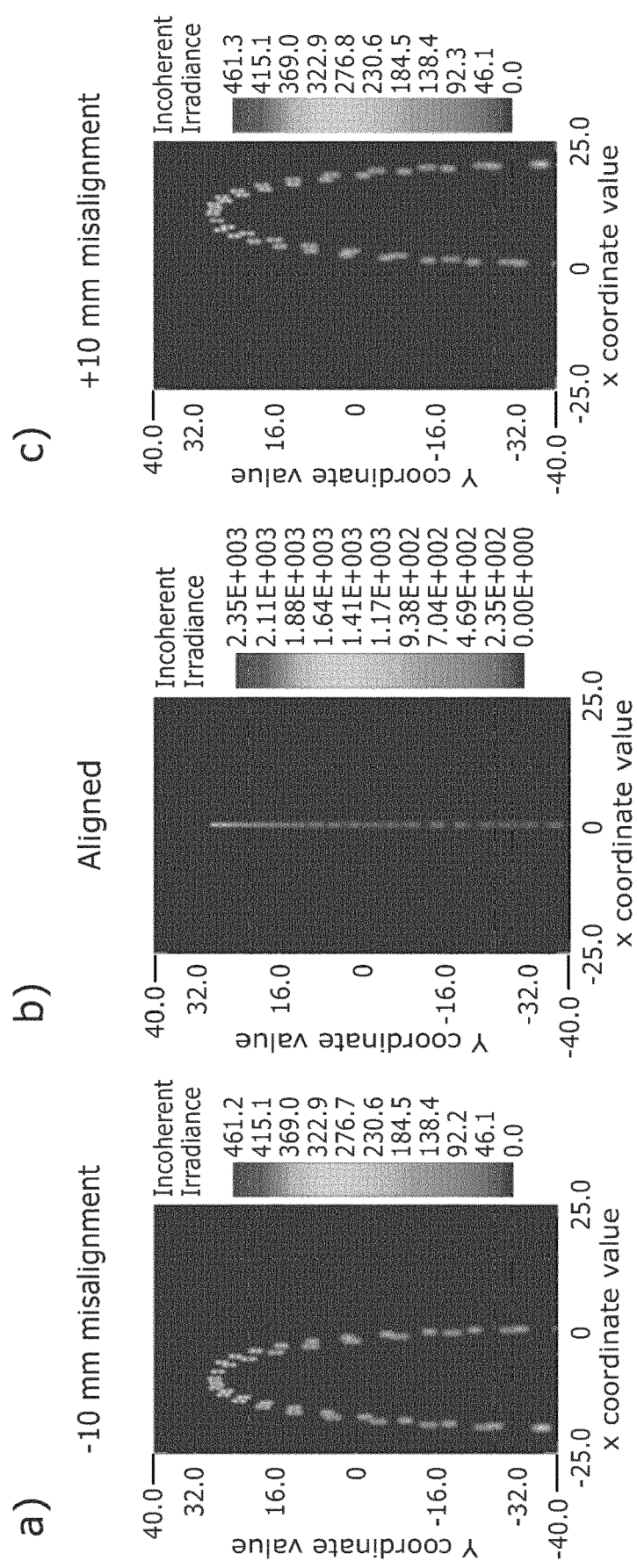
FIG. 5 shows standing modes of the multipass cell of the first embodiment.

FIG. 5 shows a further study of the stability of the geometry of this embodiment, in which a misalignment is applied to the spherical mirror 307 in the x-dimension. The simulations are depicted in FIGS. 5(a), 5(b) and 5(c). The mirror 307 is considered to be aligned if its centre lies on the same segment originating from the source of the light 301 and passing across the centre of the slit 306 (between the prisms 305A and 305B). The mirror 307 is moved away from this segment by 10 mm in the positive direction and then by 10 mm in the negative direction. The stability of the system is demonstrated by simulating the impact location of the light on the prism mirror 305A as a function of these misalignments. The behaviour on the prism mirror 305B is analogous.

FIG. 5(b) corresponds to the case in which no misalignment occurs. In this case, the standing modes within the cavity 315 are located onto a single line over the prism mirror 305A. When negative (FIG. 5(a)) or positive (FIG. 5(b)) misalignments of 10 mm occur, the standing modes move from a single line and form a set of two parabolas. The light traverses the two parabolas in sequence, one after another. This is important and allows the entry point and the exit point of the light to coincide, which is important for the stability of the cell 300.

An advantage of providing a highly stable multipass cell 300 is that the optical path length traversed by light in the cell 300 is easily adjustable by changing the distance d between the spherical mirror 307 and the two prism mirrors 305A and 305B. The benefits of increased optical path length for absorption spectrometry can be appreciated by considering the Beer-Lambert equation (Equation (1)) for different gaseous concentrations as a function of different optical path lengths, as shown in FIG. 6.

Figure 6:
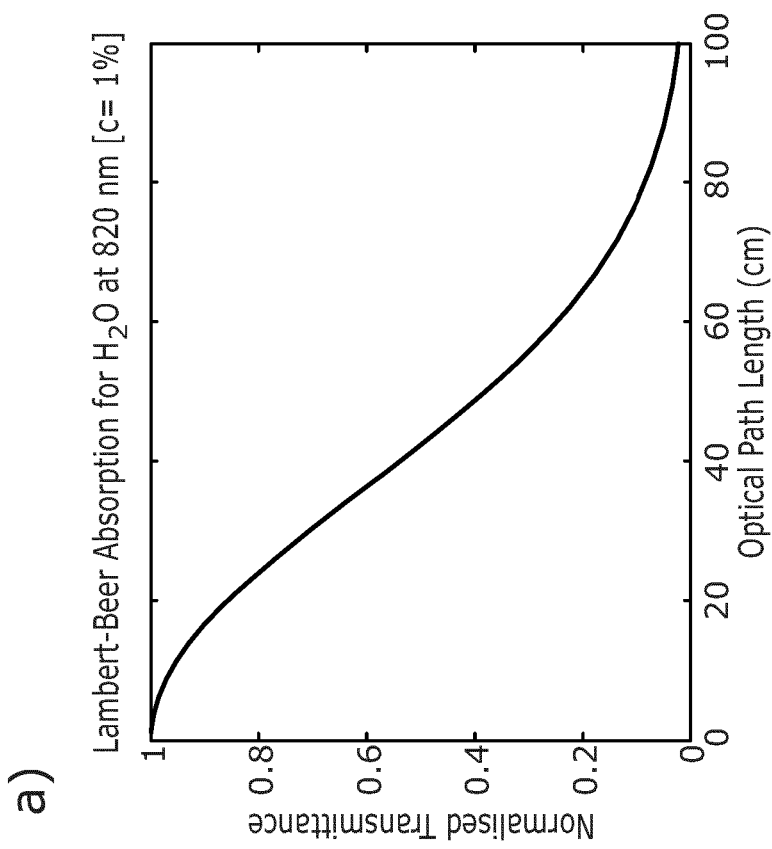
FIG. 6 shows transmittance graphs of water vapour.
Figure 6:
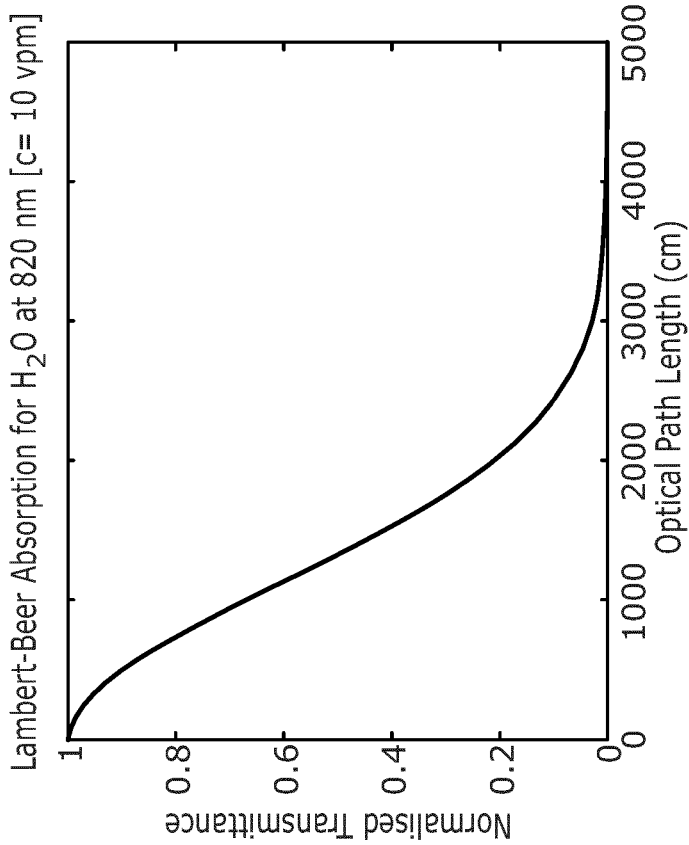

In FIG. 6, a coherent beam of 1 mm diameter is assumed to provide simulated transmittance graphs showing absorption by water vapour of a coherent laser beam as a function of optical path length. The beam passes through a volume that is proportional to the cross section of the beam itself, multiplied by the optical distance travelled. In this example, the weak atmospheric rotational-vibrational absorption transition of water vapour ($H_2O$) at 820 nm is considered. A temperature of 20° C. and a pressure of 105 Pa are assumed. FIG. 6(a) depicts the absorption of water vapour for a concentration of $10^4$ vpm (volumetric part per million), i.e. 1% vol. In this case, as the beam travels through the gas, short optical path lengths of less than 1 m long are sufficient to strongly reduce the coherent beam intensity to less than 10%. Therefore, a single pass absorption setup can lead to significant absorption of the laser light by gaseous water.

However, as can be seen from FIG. 6(b), for a lower water vapour concentration of 10 vpm, in order to obtain the same sensitivity (beam intensity reduced to less than 10%), optical path lengths of 30 m are necessary. This requires the use of a longer path length. The multipass structures presented in this disclosure are ideal for easily obtaining such optical path lengths.

Nevertheless, it is straightforward to avoid significant reductions in laser pulse intensity (e.g. when a double-pulse laser system is required, in which absorption by a gas should be avoided) simply by ensuring that the cell is not filled with water vapour. For instance, if the cell contains air, or another dry gas (not containing water vapour), at room pressure and temperature, then it can be used to provide a double-pulse generator even when optical path lengths of approximately 100 m are used without any significant reductions in pulse intensity occurring due to absorption. Alternatively, the cell could be evacuated (using a vacuum pump), or filled or flushed with a non-absorbing gas (transparent at the wavelength of the incident light), such as argon, helium or nitrogen for example.

Thus, it can be seen from FIGS. 4A to 4C and 5 that the multipass cell 300 of the first embodiment provides a stable system that can provide long optical path lengths even in the presence of misalignment between the optical components, whilst FIG. 6 demonstrates the utility of such a multipass cell 300 in laser absorption spectrometry. However, a number of features of the multipass cell of FIGS. 3A to 3D may be omitted or modified whilst retaining these advantages.

For example, the cell may be used as an optical delay line rather than as an absorption spectrometer and so the sealed container 302, the inlet 303A and the outlet 303B, and the optical window 304 may be omitted when there is no need to store a gaseous sample. Moreover, the advantage of improved stability can be achieved using two planar mirrors that are substantially perpendicular, rather than prisms 305A and 305B. Such an arrangement would provide the same effect of being partially retroreflective for light incident thereon. Furthermore, the aperture 306 through which light enters the cavity 315 can be placed in the second reflector arrangement rather than the first reflector arrangement. Additionally, the spherical mirror 307 need not be spherical and could have various other forms whilst benefiting from the partially retroreflective prisms 305A and 305B. Thus, it can be seen that the multipass cell 300 of this embodiment is one specific example of an advantageous arrangement but that various alterations and variations may be made.

Hence, returning to the generalised terms used previously, the first reflector arrangement of this disclosure preferably comprises first and second surfaces that are reflective. The first reflector arrangement may be configured such that light incident thereon is reflected from the first surface to the second surface, and to the second reflector arrangement. Light reflected from the second surface may be incident on a third surface of the first reflector arrangement before being reflected to the second reflector arrangement, or the light reflected from the second surface may be reflected directly to the second reflector arrangement without being reflected by any further surfaces.

The first and second surfaces are preferably substantially perpendicular. The first and second surfaces are preferably substantially planar. This arrangement can be used to provide a retroreflective action on light to improve the mechanical stability of the multipass cell. Perfectly planar, perpendicular surfaces will exhibit full retroreflectivity but some deviations from perfectly planar, perpendicular surfaces may be tolerated. For instance, the surfaces may deviate from being perfectly planar and/or perfectly perpendicular, provided that the effect of (at least) partial retroreflectivity is still achieved. When light possesses some components non-normal to the surface of the second reflector arrangement (e.g. a spherical mirror), then this will enter in the cavity and can form a set of standing wave-like patterns, as shown in FIGS. 4A to 4C and 5.

Furthermore, there is no requirement for the entire first or second surface to be entirely planar. For instance, one or both of the surfaces may have a curved portion (e.g. at the edge or edges) in addition to a planar portion. In this case, provided that the substantially planar portions of the first and second surfaces are substantially perpendicular to one another, they can still work together to partially or fully retroreflect light incident thereon.

Thus, the disclosure provides a multipass cell comprising: a first reflector arrangement; and a second reflector arrangement; wherein the first reflector arrangement comprises first and second surfaces that are reflective, wherein the first and second surfaces are substantially perpendicular and/or substantially planar.

The planes of the first and second surfaces may define a common axis and the first reflector arrangement may be retroreflective for light incident perpendicular to the common axis. In the context of planar surfaces, the common axis is the line of intersection defined by the planes containing the planar surfaces. Any two non-parallel planes define a line of intersection. Therefore, even if two planar surfaces do not actually intersect, the planes in which the surfaces lie will define an axis of intersection. The axis of intersection may be considered to be the line along which the planar surfaces would intersect if the planes had infinite spatial extent.

Preferably, the first reflector arrangement comprises first and second prisms and the first and second surfaces are faces of the first and second prisms respectively. Prism mirrors are widely available optical components that allow the advantageous embodiments described previously to be manufactured accurately and easily. For example, the prism mirrors may have a cross-section that is a right-angled isosceles triangle (i.e. with interior angles of 90°, 45° and 45°). In this case, by placing two such prisms adjacent one another, with both prisms resting on their shorter (non-hypotenuse) face, a partially retroreflective surface (defined by the two surfaces of the prisms that will be perpendicular in this arrangement) can be fabricated easily. Thus, this embodiment advantageously uses inexpensive, commercially available components to provide a cost-effective and reliable method for manufacturing a stable multipass cell.

The second reflector arrangement is preferably configured such that light incident thereon is reflected towards the first reflector arrangement. For example, the second reflector arrangement may be configured such that light received from the first reflector arrangement is reflected to the first reflector arrangement and, because the first reflector arrangement is at least partially retroreflective, light may be made to repeatedly bounce between the first and second reflector arrangements. This may be achieved by ensuring that the first and second reflector arrangements face one another. For example, the first reflector arrangement is at least partially retroreflective and is therefore retroreflective for light received from a range of directions. Accordingly, the second reflector arrangement may be positioned within the range of directions for which the first reflector arrangement is retroreflective. When the second reflector arrangement has a concave face, this face may be facing the at least partially retroreflective portion of the first reflector arrangement. In this way, the first and second reflector arrangement can define a stable optical cavity.

The second reflector arrangement is preferably configured such that light incident thereon is focused towards the first reflector arrangement. The focusing action of the second reflector arrangement works together with the retroreflective action of the first reflector arrangement to inhibit the spreading of light and improve stability. The relationship between the spacing of the reflector arrangements and the focal length of the second reflector arrangement will influence the number of passes traversed by light within the cell.

The second reflector arrangement may comprise a concave surface that is reflective. The concave surface may be an ellipsoidal surface, a spheroidal surface, or a spherical surface. For example, an ellipsoidal reflector having one elongate axis parallel to the line of intersection defined by two reflective planar surfaces could be used. In such a case, the elongated axis would affect the mechanical tolerances as the useful surface to compensate for misalignment would be elongated in one direction and shortened in the other direction. Thus, surfaces with a higher degree of spatial symmetry provide improved stability and consequently, a spherical surface (i.e. a portion of the surface of a sphere with an opening for allowing light in) is most preferred. Minor deviations from spherical may be tolerated. The combination of two plane prism mirrors with a spherical (i.e. centrally symmetrical) mirror provides most improved stability as it means that a slight misalignment of the spherical mirror will not be further amplified, and the light path will still lie in between the volume within the mirrors of the cavity.

Advantageously, in this disclosure, the separation between the first and second reflector arrangements is adjustable. Hence, the multipass cell is configured such that the optical path length traversed by light is adjustable. Whilst not shown in FIGS. 3A to 3D for the purposes of simplicity, the first and second reflector arrangements 305 and 307 are relatively moveable (e.g. by moving one or both). This allows the separation to be controlled and hence the optical path length to be adjusted. The relative motion may be provided by, for example, actuating one or both of the reflector arrangements. The optical path length may be adjustable by changing the number of times light traverses the multipass cell. For instance, increasing the separation may lead to an increase in the distance traversed by light within a single pass, but it may also cause the light to traverse a different number of passes within the cell, further increasing the optical path length. The improved stability of the disclosure allows relatively long optical path lengths to be obtained whilst providing control over the path length.

Using the cells of the present disclosure, the optical path length is adjustable to: greater than or equal to 30 cm (and preferably no more than 1 m, 5 m, 15 m, 25 m, 40 m, 50 m, or 100 m); greater than or equal to 1 m (and preferably no more than 5 m, 15 m, 25 m, 40 m, 50 m, or 100 m); greater than or equal to 5 m (and preferably no more than 15 m, 25 m, 40 m, 50 m, or 100 m); greater than or equal to 15 m (and preferably no more than 25 m, 40 m, 50 m, or 100 m); greater than or equal to 25 m (and preferably no more than 40 m, 50 m, or 100 m); greater than or equal to 40 m (and preferably no more than 50 m, or 100 m); greater than or equal to 50 m (and preferably no more than 100 m); or greater than or equal to 100 m (and preferably no more than 150 m). These may be converted into equivalent temporal values by noting that the speed of light is approximately $3 \times 10^8$ ms$^{-1}$.

The described embodiments exhibit unexpectedly high mechanical tolerances to provide a multipass cell that is suitable to withstand vibrations and simplify mechanical alignment in industrial implementations. The advantages of this disclosure compared to previous multipass cells are numerous and include the increased stability up to 4° (approximately 70 milliradians) of misalignment, long optical path lengths that can be adjusted easily, and an architecture that is simple to manufacture reliably and efficiently.

In the embodiment of FIGS. 3A to 3D, FIGS. 4A to 4C and FIG. 5, the aperture 306 through which light enters the optical cavity 315 is positioned between the two prisms 305A and 305B of the first reflector arrangement 305. However, FIG. 7 depicts a second embodiment in which many of the advantages described previously are achievable by providing an aperture 706 in a second reflector arrangement 707, rather than between the prisms 705A and 705B.

Figure 7:
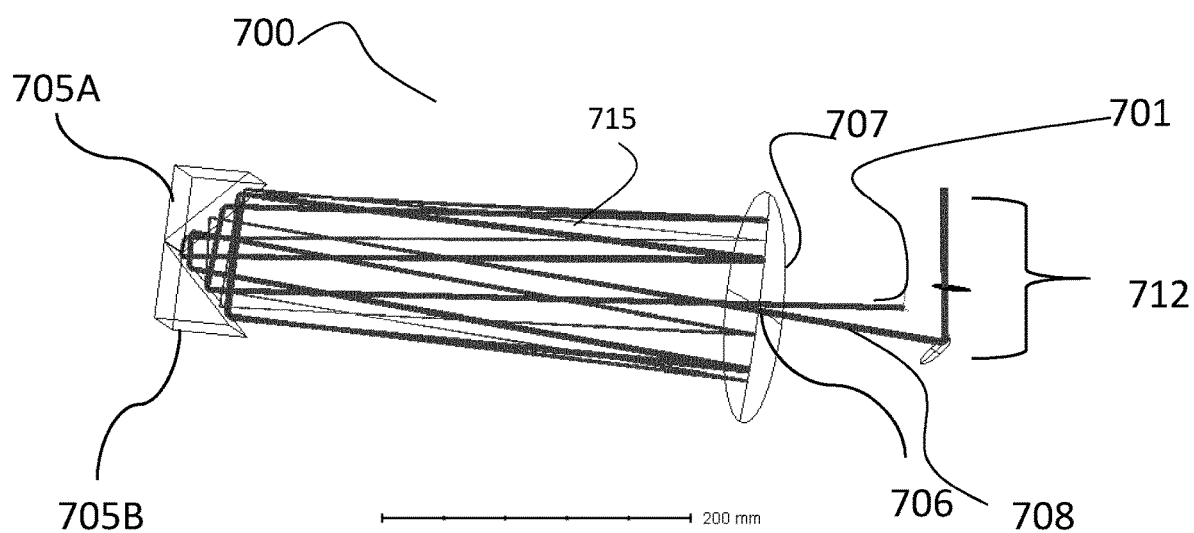
FIG. 7 shows schematically a multipass cell in a second embodiment.

The embodiment of FIG. 7 shows a multipass cell 700 comprising a first reflector arrangement 705 that comprises two prism reflectors 705A and 705B, which are positioned such that two faces of the prisms 705A and 705B are perpendicular and provide a partially retroreflective surface. A second reflector arrangement in the form of a spherical mirror 707 is provided facing the prisms 705A and 705B. The spherical mirror 707 comprises a central aperture 706 for allowing light into and out of the optical cavity 715 of the multipass cell 700. Light entering 701 the cell 700 is repeatedly reflected between the first 705 and second 707 reflector arrangements before exiting the cavity 715 via the aperture 706 along the direction of the exiting light 708. Due to the high degree of geometric similarity, the standing modes provided by the first 705 and second 707 reflector arrangements are similar to the arrangements 305 and 307 of the first embodiment. Light emerging from the cell is then directed to its destination via an optical arrangement 712, which is shown as comprising a mirror and a lens in FIG. 7. The second embodiment provides the benefits of improved stability and adjustability that the first embodiment provides.

Figure 8:
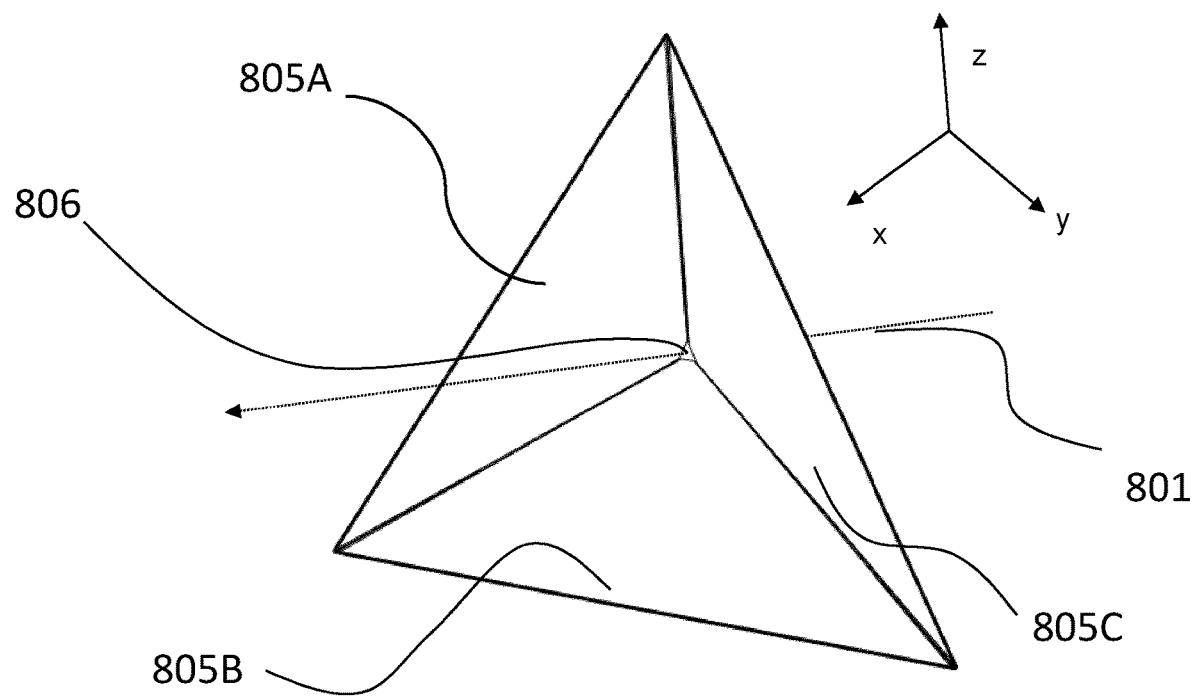
FIG. 8 shows schematically an alternative first reflector arrangement for the multipass cells of the first and second embodiments.

Turning next to FIG. 8, there is depicted a reflector arrangement 805 that comprises three planar reflective surfaces 805A, 805B and 805C that are mutually perpendicular. The three surfaces 805A, 805B and 805C define a corner reflector that is retroreflective. An aperture 806 is provided at the corner of the corner reflector 805 to allow light to pass through the corner reflector. Light 801 passing through the rear side of the corner reflector 805 is depicted.

The reflector arrangement 805 of FIG. 8 can be used in multipass cells such as those described in the first and second embodiments, in place of prisms 305A and 305B, or in place of prisms 705A and 705B. If the reflector arrangement 805 of FIG. 8 is used in the embodiment of FIG. 7, then the aperture 806 may be omitted. The reflector arrangement 805 again provides improved mechanical stability due to the use of a retroreflector to inhibit the spreading of light in an optical cavity.

Hence, returning to the generalised language used previously, in the multipass cells of the present disclosure, the first reflector arrangement may further comprise a third surface that is reflective, wherein the first, second and third surfaces are substantially mutually perpendicular. Thus, a corner reflector can be provided to improve mechanical stability.

The first and second reflector arrangements may define an optical cavity, and at least one of the first and second reflector arrangements preferably comprises an aperture for allowing light to enter and/or exit the optical cavity. The size of the aperture may be adjustable to provide control over the size of the light beam or pulse that enters the cavity. The aperture can take many forms.

When the first reflector arrangement comprises first and second prisms, a slit between the edges of the first and second prisms may define an aperture. A particular advantage of this arrangement is that it is simple to provide an aperture between two prisms by mounting the prisms such that there is a slit between them, without needing to create an aperture in a reflector (e.g. by making an aperture in a spherical reflector or a corner reflector, which could cause damage or mirror imperfections). Thus, this arrangement is easy to make accurately and without risking damage to delicate optical components. The size of the aperture may be adjusted by actuating the prisms to be closer together or further apart. The prisms may be relatively moveable to provide such adjustment.

When the first reflector arrangement comprises first, second and third surfaces, an opening at a corner of the first, second and third surfaces (e.g. the point at which the planes of the three surfaces intersect) may define an aperture. Similarly, an opening at the centre (e.g. a point on the second reflector surface that is substantially aligned with the longitudinal axis of the cell) of the second reflector arrangement may define an aperture. This could be a small hole in the centre of a concave reflective surface, for example. Such apertures allow light to enter and/or exit the optical cavity in arrangements that are mechanically stable. In such cases, the size of the aperture may be adjusted by partially covering the aperture with an opaque material (which may be moveable).

Figure 9A:
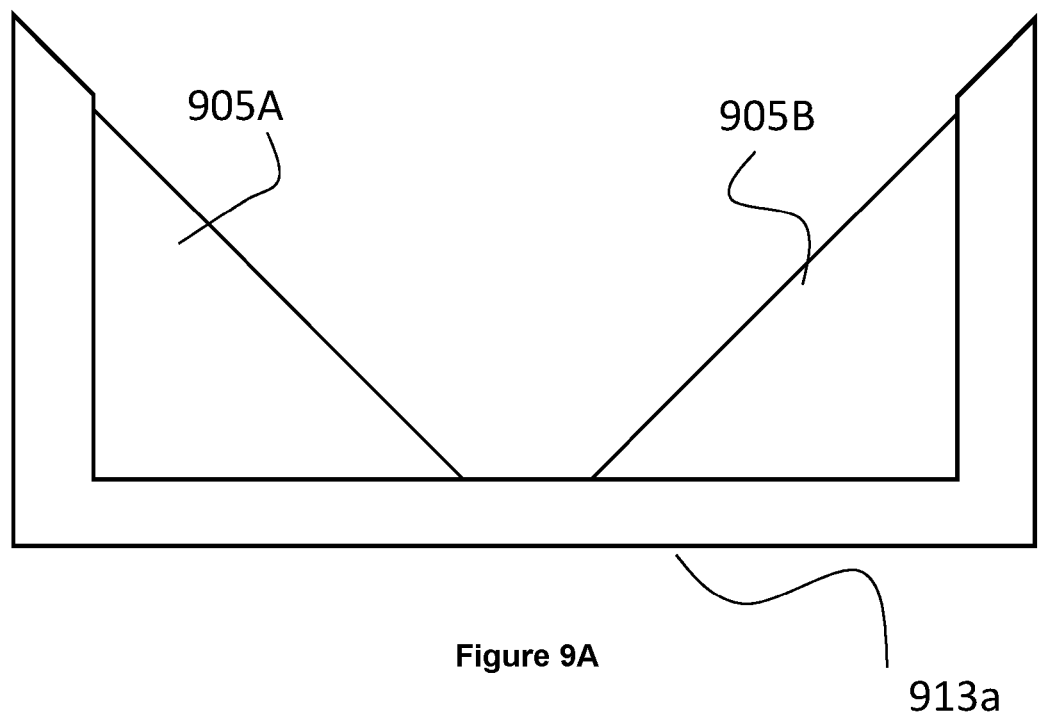
FIGS. 9A and 9B show schematically mounting structures for the multipass cells of the first and second embodiments.
Figure 9B:
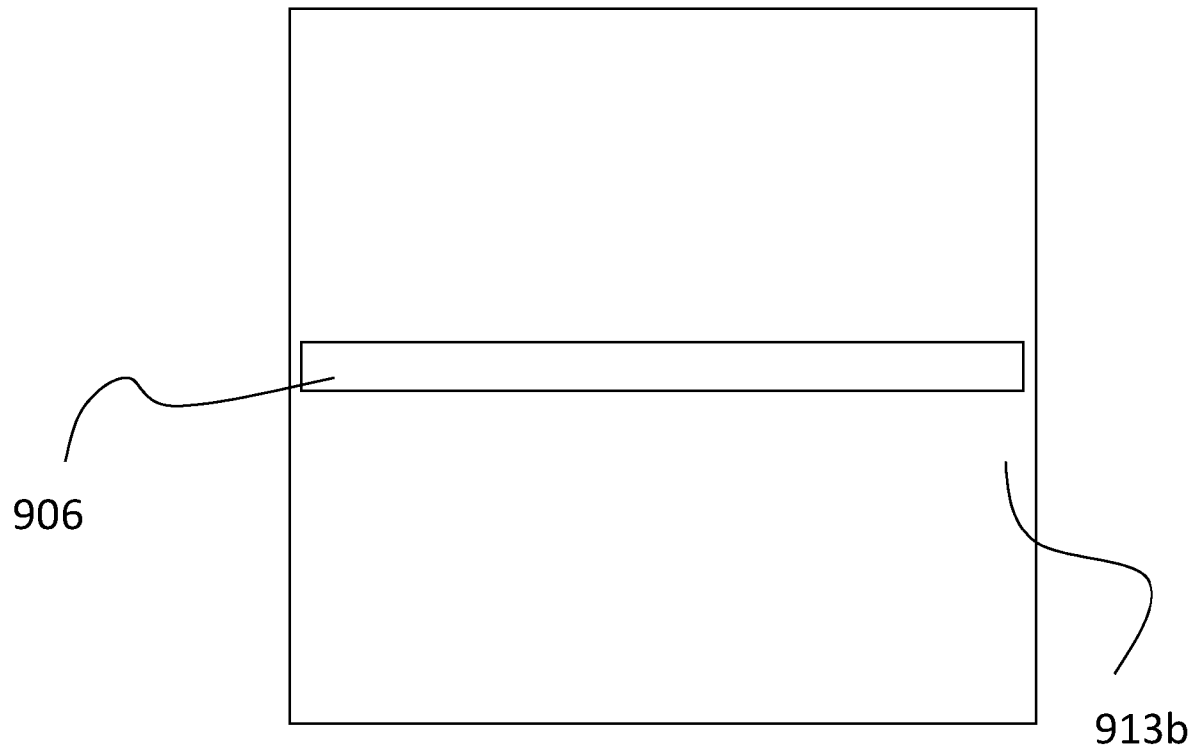

Turning next to FIGS. 9A and 9B, two mounting structures 913a and 913b are depicted for a reflector arrangement 905 comprising two prisms 905A and 905B. The prisms 905A and 905B could be the prisms 305A, 305B or 705A, 705B of the multipass cells 300 or 700 respectively. The mounting structures 913a and 913b can therefore be used in the multipass cells 300 and 700 of FIGS. 3A to 3D and 7.

The mounting structure 913a of FIG. 9A is a frame that is configured to hold the prisms 905A and 905B. The mounting structure 913a in FIG. 9A is shown from one end of the pair of prisms 905A and 905B. The mounting structure may extend along the long edges of the prisms (into the page, along the prism axes) and the opposite end of the mounting structure 913a holds the opposite end of the prisms 905A and 905B in the same way. The mounting structure 913a is dimensioned such that it can hold the non-reflecting edges of the prisms 905A and 905B so as to hold the prisms 905A and 905B securely in position. A minor portion of the mounting structure covers the reflecting surfaces (i.e. the hypotenuse of the prisms 905A and 905B) but the majority of the reflecting surface is exposed so as to allow the prisms 905A and 905B to reflect light within the cell.

The mounting structure 913a may have a friction coating (e.g. rubber) to ensure that the prisms 905A and 905B are held firmly in position. The prisms 905A and 905B may fit within the mounting structure 913a using an interference fit. Alternatively, the prisms 905A and 905B may be held to the mounting structure 913a with an adhesive. In any case, the mounting structure ensures that the reflecting surfaces of the prisms 905A and 905B are substantially perpendicular so as to combine to provide a partially retroreflective surface.

FIG. 9B shows a further mounting structure 913b that may be used in addition to or instead of the mounting structure 913a of FIG. 9A. The mounting structure 913b of FIG. 9B may serve as the base of the mounting structure 913a of FIG. 9A or the mounting structure 913b may itself be a standalone component. The mounting structure 913b of FIG. 9B comprises a flat portion of material to which prisms 905A and 905B may be attached. The mounting structure 913b comprises a slit 906 for allowing light to pass through. The prisms 905A and 905B may be mounted either side of the slit 906 such that the faces of the prisms 905A and 905B are substantially perpendicular. Thus, a partially retroreflective reflector arrangement can easily be provided using a single sheet of material with a slit in it, and two prisms 905A and 905B, which are standard optical components.

The mounting structures 913a and 913b of FIGS. 9A and 9B may be used to ensure that the relative angle between the two prism mirrors 905A and 905B is zero or substantially zero (e.g. close enough to zero to ensure that at least partial retroreflectivity is obtained). In such a case, the two mirrors can together rotate by up to +/−1° approximately and still provide a stable multipass pattern when used with the previously-described multipass cells. However, if the relative angle between the two prism mirrors is larger than 0.1°, then the pattern may be negatively affected. The use of such a mounting structure can ensure that the relative angle between the prisms 905A and 905B is zero or close enough to zero to provide good performance. The mounting structures 913a and 913b of FIGS. 9A and 9B may be formed from various materials (e.g. metal such as aluminium) and using various construction techniques (e.g. welding, moulding or 3D printing).

Hence, in the generalised language used previously, the first reflector arrangement preferably comprises a mounting structure configured to mount the first and second prisms such that the first and second surfaces are substantially perpendicular. The use of a mounting structure can help to ensure that the surfaces are positioned correctly to within an acceptable degree of misalignment.

The embodiments shown in FIGS. 3A to 9B have been discussed primarily with reference to a multipass cell for use in absorption spectrometry. In such cases, using the generalised language discussed previously, the multipass cell preferably comprises a housing for containing a gaseous sample, wherein the first and second reflector arrangements are within the housing. This ensures that a sample to be analysed can be held within the cell. In such a case, the housing preferably comprises an optical window for allowing light into the multipass cell. The optical window is preferably aligned with an aperture (e.g. an aperture in a reflector arrangement) such that light can enter the optical cavity from outside the housing of the cell. Any material for the optical window can be used provided that the material is transparent for light having the wavelength of the light source used. The multipass cell preferably further comprises an inlet and/or an outlet for a gaseous sample. Various inlet and outlet mechanisms may be used. In embodiments where the multipass cell is used in a double pulse laser system, the inlet and/or an outlet may be used for a purge gas (e.g. argon) that is transparent for light having the wavelength of the laser light.

Figure 10:
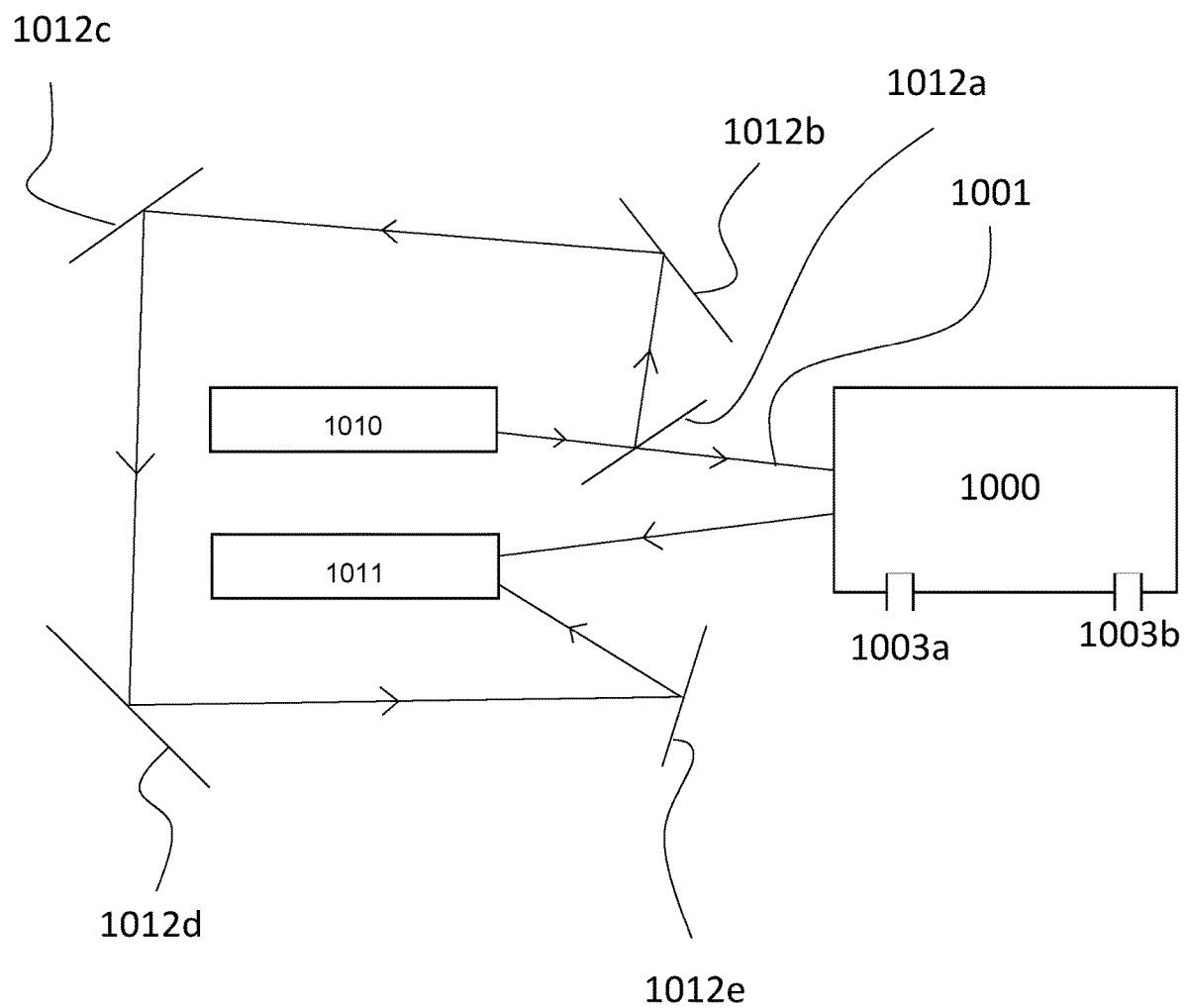
FIG. 10 shows schematically an absorption spectrometer utilising the multipass cells described herein.

In FIG. 10, an example of such an absorption spectrometry system is shown schematically. The system comprises a multipass cell 1000, which could be any multipass cell described previously, to provide an optical path along which light interacts with a sample. The cell has an inlet 1003a and an outlet 1003b for allowing a sample into and out of the cell. The system also comprises a light source 1010, which may be a laser. The light source provides a beam of light 1001 that is directed to an optical arrangement 1012, which ensures that at least some of the light from the light source 1010 is directed into the multipass cell 1000 to interact with a sample. The system further comprises a detector 1011 arranged to detect light that passes through the multipass cell 1000, interacts with the sample, and emerges from the multipass cell 1000. The optical arrangement 1012 directs some light to the detector 1011 without entering the multipass cell 1000.

The optical arrangement comprises four mirrors 1012b, 1012c, 1012d and 1012e, which direct some light around the outside of the cell 1000 to be received at the detector 1011. The optical arrangement also comprises a beamsplitter 1012a, which allows some light into the multipass cell 1000 whilst ensuring that some light does not enter the multipass cell 1000 and instead reflects from mirror 1012b to mirror 1012c, to mirror 1012d, to mirror 1012e for detection by the detector 1011.

The beam splitting can be used to obtain a baseline intensity level, $I_0$, for the light source 1010 indicated by the intensity of light that does not pass through the cell 1000. This can be compared against the intensity of light that has passed through the cell to the detector, $I_D$, to obtain a measure of how much light was absorbed by the sample in the cell 1000. The detector 1011 may comprise a plurality of detector elements: one or more elements for measuring $I_0$ and one or more elements for measuring $I_D$. Alternatively, the detector 1011 may comprise a single detector element for measuring $I_0$ and $I_D$ alternately (for example, the two light beams may pass through a beam chopper, which blocks one beam at a time, so that the detector alternates between measuring the $I_0$ beam and the $I_D$ beam in synchronisation with the chopper).

The light source 1010 can be any type of laser including, for example, a tuneable diode laser, a wavelength stabilised laser diode, a distributed feedback laser diode or an external-cavity diode laser. Whilst a tuneable diode laser is preferred, any solid-state, gas, liquid, chemical, metal-vapour, dye or semiconductor laser may be used. The detector 1011 may comprise one or more photodiodes of any type for detecting the light 1001 created by the light source 1010. Other types of beam exhibiting extremely low divergence (i.e. approximately collimated beams) may be used. For instance, it is possible in some cases to provide an LED or other optical emitters exhibiting a few degrees divergence (e.g. by using collimating optical elements), but lasers typically exhibit divergences on the order of tenths of a degree and are therefore preferred in this disclosure.

As noted previously, the angle at which light enters the multipass cells 300 and 700 of the first and second embodiments can be used to control the number of times light traverses the reflector arrangements of the cell and hence the optical path length. Thus, in the embodiment shown in FIG. 10, the light source 1010 may be capable of changing the direction at which light enters the cell 1000 (e.g. by being rotatable or by being rotatably mounted). Alternatively, further optical elements (e.g. adjustable mirrors) may be provided to allow the angle of light entering the cell to be varied. For instance, adjustable mirrors may be positioned between the splitter 1012a and the cell 1000 so as to vary the angle at which light 1001 enters the cell 1000.

In generalised terms, the present disclosure provides a system comprising: any of the multipass cells described previously; and an optical arrangement that is configured to direct light into the multipass cell. The optical arrangement is preferably configured such that the angle at which light is directed into the multipass cell is adjustable. The angle may be defined relative to an axis defined by the multipass cell (e.g. a longitudinal axis, such as the axis extending between the centres/midpoints of the first and second reflector arrangements). The angle between the direction in which light is directed into the multipass cell and the longitudinal axis defined by the multipass cell may be: from 0° to 20°; from 1° to 15°; or from 2° to 10°. If an aperture of the cell and/or an optical window of the cell are perpendicular to the axis defined by the cell, then the angle at which light enters the cell may instead be expressed as relative to the normal to the aperture, because in such a case the normal to the aperture would be parallel to the longitudinal axis of the cell.

The provision of an adjustable angle allows the optical path length to be controlled whilst retaining a stable configuration and the advantages associated with such stability.

Such optical arrangements can be provided independently of a detector or a light source. The optical elements may be affixed to the multipass cell (e.g. attached to the outside of the cell) or formed integrally with the cell housing.

The system may further comprise a light source configured to direct light towards the optical arrangement. The system may also comprise a detector configured to detect light from the multipass cell. When a cell, laser and detector are used in combination, an improved laser absorption spectrometer is provided. The optical arrangement is preferably configured to direct light from the multipass cell to the detector.

The multipass cells of this disclosure can be employed in contexts other than optical absorption spectrometry. For instance, in FIGS. 11A, 11B, 11C and 11D, there are depicted four configurations of a double-pulse laser system for generating first and second laser pulses. Because the multipass cell provides a relatively long optical path length when compared with existing multipass cells, the cell effectively functions as a delay line that introduces a relatively long time delay between two laser pulses. Moreover, the geometry of the cell ensures that the light 1108 emerging from the cell is collinear with the light reflected from the exterior surface 1114 of the cell.

The double-pulse laser system of FIGS. 11A to 11D is similar to the previously-described systems in that it comprises a multipass cell having two prisms 1105A and 1105B and a spherical reflector 1107 that define an optical cavity 1115. Light 1101 enters the cell at a slight angle, as described previously. The double-pulse laser system also comprises an optical arrangement 1112 for guiding the light 1108 emerging from the cell towards a target destination 1116, which could be a sample. The optical arrangement comprises a mirror 1112b. An important difference between the double-pulse laser system and the previously-described multipass cells is that the exterior surface of the prisms 1105A and 1105B is reflective and comprises a small aperture (aligned with the slit between the prisms 1105A and 1105B) for allowing light 1101 into the cell. This reflective surface with an aperture acts as an optical splitting device 1112a for splitting light and forms part of the optical arrangement 1112.

More specifically, in the schematic setup of the double-pulse system of FIGS. 11A to 11D, a collimated and pulsed laser beam 1101 is directed towards a planar mirror 1112a on the exterior (rear surface) of the prisms 1105A and 1105B. The pulsed laser beam path is represented in FIGS. 11A to 11D as solid continuous lines, although these lines should not be mistaken for a continuous wave laser emission. The angle of the pulsed beam 1101 is slightly tilted with respect to the normal of the mirror 1112a and is typically 2-6°. The normal of the mirror 1112a is parallel to the axis of the cell, (i.e. the longitudinal axis extending between the slit between the prisms 1105A and 1105B and the centre of the spherical mirror 1107).

The mirror 1112a comprises a central, circular aperture of 1 mm diameter, allowing part of the laser pulse 1101 to be sampled through it and part of the laser pulse 1101 to be reflected from it along the path 1108. Similarly to the previously-described embodiments, the angle of light 1108 emerging from the cell (relative to the normal of the aperture) is the same magnitude but the opposite direction to the angle of the incoming light 1101, which arises due to the geometry of the cell.

The aperture of the optical splitting device 1112a is dimensioned so that an incoming light pulse 1101 is split (e.g. divided into two distinct pulses), with approximately half of the light being reflected from the exterior surface 1114 towards the optical arrangement 1112b and half of the light entering the cell, where it is reflected multiple times before ultimately leaving the cell and reaching the optical arrangement 1112b. Whilst the aperture is 1 mm in diameter in FIGS. 11A to 11D, other widths (e.g. diameters of 0.5 mm, 1.5 mm, 2 mm, 2.5 mm and so on) may be used depending on the width of the laser beam used. In the specific systems depicted in FIGS. 11A to 11D, the pulsed laser beam 1101 possesses a Full-Width-At-Half-Maximum (FWHM) of 1 mm.

The system is configured such that the pulse 1101 is centred on the edge of the aperture of mirror 1112a, and the mirror 1112a has a radius of 25 mm (i.e. of a similar size to the prisms 1105A and 1105B). Various optical elements could be used to direct the pulse 1101 to the mirror 1112a in this way. Half of the pulse is reflected by the surface of the mirror 1112a while the other half passes through the aperture. The reflected pulse is directed towards the planar mirror 1112b and then towards the surface of a sample 1116. The transmitted pulse is directed towards the spherical, concave mirror 1107 of the cell, which has a radius of curvature r=1000 mm and a diameter of 50 mm. This mirror 1107 reflects and focuses the pulse back towards the two right-angle prism mirrors 1105A and 1105B, as shown in FIGS. 11A to 11D. The two right-angle prism mirrors 1105A and 1105B have a segment size of 25 mm. In this context, the segment size is the length of the two sides of the right-angled triangle that meet at right angles (i.e. the length of the non-hypotenuse lengths of the triangular cross-section of the prisms 1105A and 1105B). The combination of the mirrors 1105A, 1105B and 1107 forms a cavity 1115 system, where the pulse that enters through mirror 1112a is reflected back and forth for a number of times before eventually exiting from the aperture of the mirror 1112a.

The total optical path length difference (OPD) provided by the systems of FIGS. 11A to 11D is defined as the difference between: a) the distance covered by the pulse that passes through mirror 1107 and which is reflected inside the cavity 1115 before exiting from the central aperture of mirror 1112a and reaching the sample 1116; and b) the distance travelled by the part of the pulse that is reflected at mirror 1112a before reaching the sample 1116. Advantageously, the OPD can be easily tuned by adjusting the distance d between: the first reflector arrangement 1105, comprising (right-angled) prism mirrors 1105A and 1105B; and the second reflector arrangement, which in this case is mirror 1107. The OPD can be controlled by adjusting just the separation d whilst leaving the geometry of the other components unchanged. By adjusting the OPD, the temporal delay Δt between the first pulse (reflected by mirror 1112a) and the second pulse (transmitted through mirror 1112a) can be adjusted.

Figure 11A:
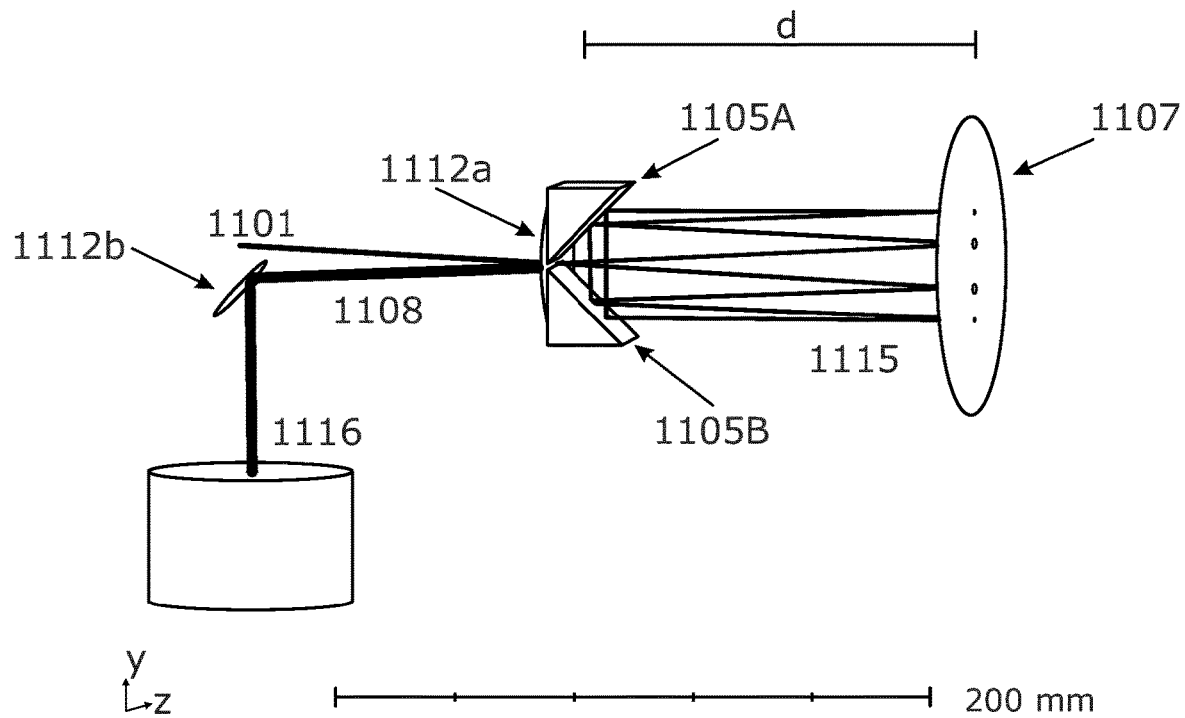
FIGS. 11A to 11D show schematically a double-pulse laser system utilising the multipass cells described herein.
Figure 11B:
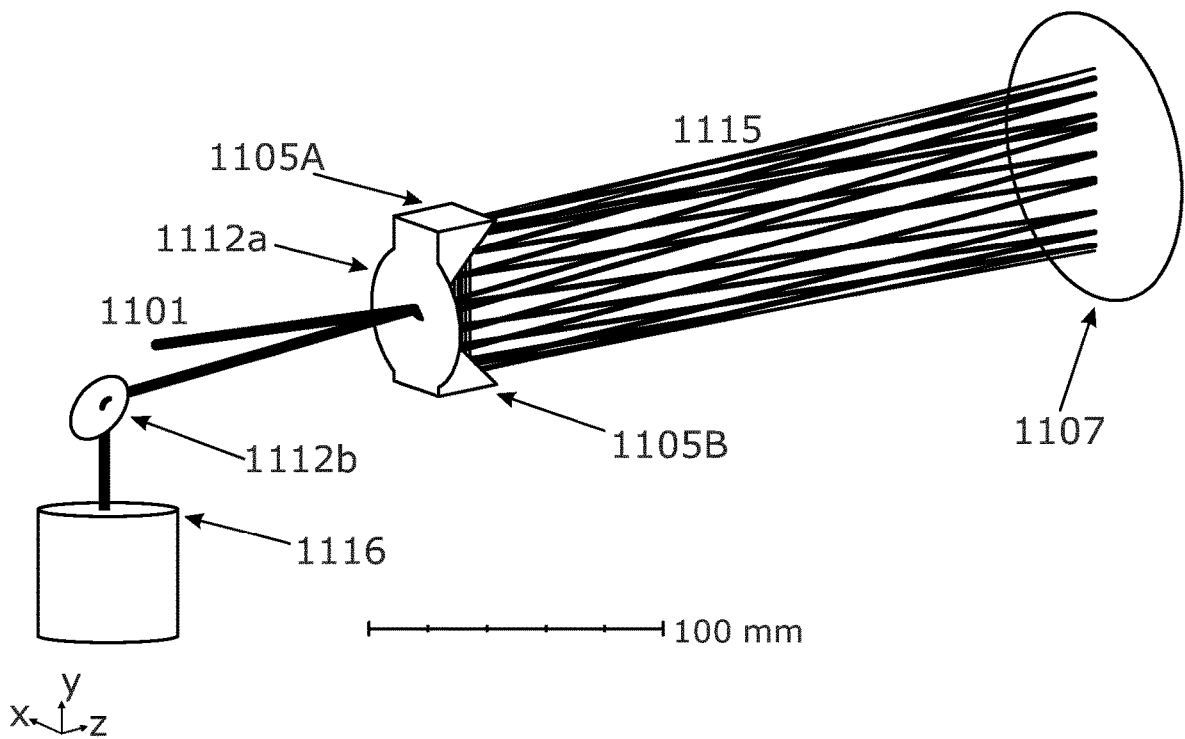
Figure 11C:
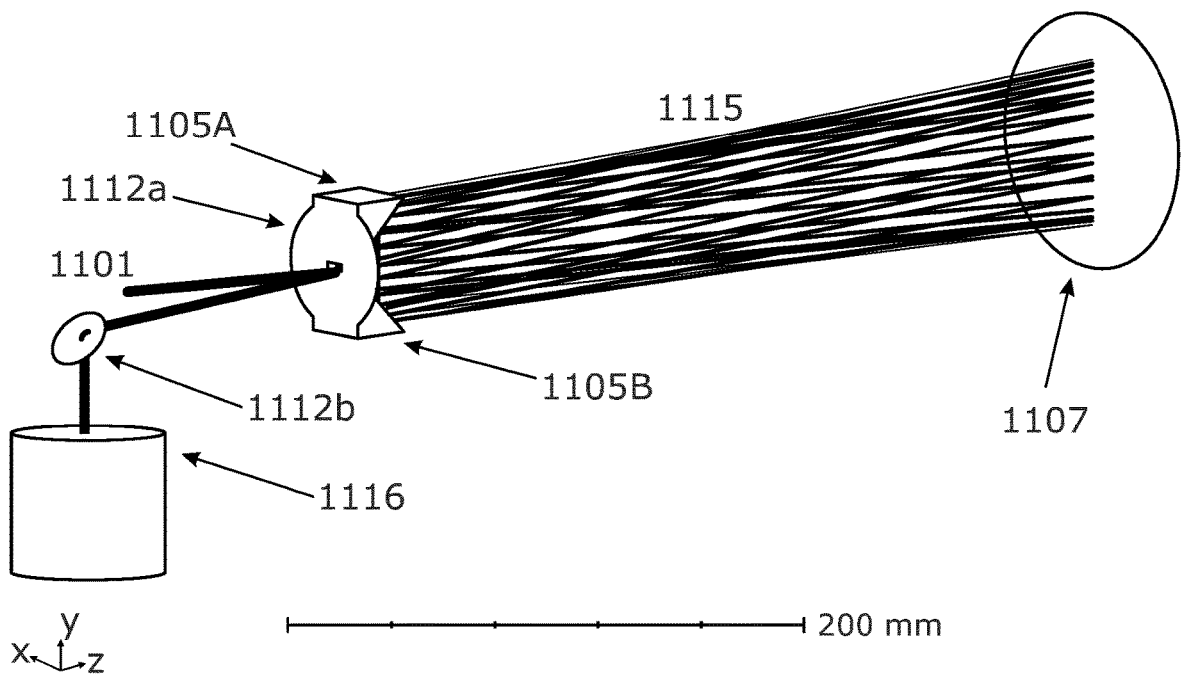
Figure 11D:
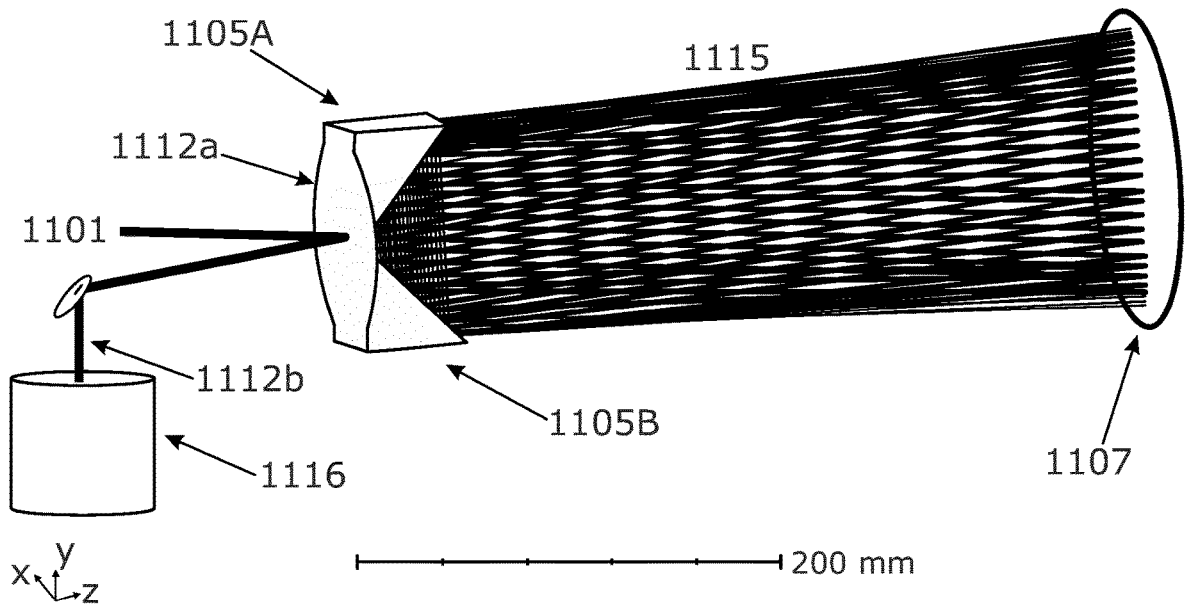

The system of FIG. 11A can be adjusted to various configurations, as shown in FIGS. 11B, 11C and 11D, and can be simulated to investigate the OPDs and temporal delays that are attainable. In the simulations, the laser pulse is taken to be Gaussian, collimated, unpolarised, with a wavelength of 532 nm, and composed by a number of rays equal to $10^4$ to achieve statistical significance. In FIG. 11A, a distance d=150 mm causes the transmitted pulse to be reflected 4 times and this leads to an OPD of 1.13 m and a corresponding Δt=3.8 ns. In FIG. 11B, a distance d=300 mm causes the transmitted pulse to be reflected 21 times and leads to an OPD of 6.75 m and a corresponding Δt=22.5 ns.

In FIG. 11C, a distance d=400 mm causes the transmitted pulse to be reflected 28 times and leads to an OPD of 12.46 m and $\Delta t$=41.5 ns.

As the distance d increases and as the number of reflections increase, the tolerances required for the mechanical alignment of the optical system become more demanding. This is of the order of ~1.5 mm and ~2° rotation angle (x,y) for the layout displayed in FIG. 11A, ~1 mm and ~1° angle for the layout displayed in FIG. 11B and ~0.5 mm and ~0.5° angle for the layout displayed in FIG. 11C. The required alignment limits the OPD that can be achieved. Nevertheless, such alignments are readily attainable using the systems of the present disclosure and temporal delays $\Delta t$ on the order of 50 ns can therefore be achieved. The temporal delays achieved using the multipass cell therefore can be 1 ns or greater (for example up to 10 ns, up to 50 ns, up to 80 ns, up to 100 ns, up to 150 ns, or greater than 150 ns), or 5 ns or greater (for example up to 10 ns, up to 50 ns, up to 80 ns, up to 100 ns, up to 150 ns, or greater than 150 ns), or 10 ns or greater (for example up to up to 50 ns, up to 80 ns, up to 100 ns, up to 150 ns, or greater than 150 ns), or 50 ns or greater (for example up to 80 ns, up to 100 ns, up to 150 ns, or greater than 150 ns), or 80 ns or greater (for example up to 100 ns, up to 150 ns, or greater than 150 ns), or 100 ns or greater (for example up to 150 ns, or greater than 150 ns). Shorter delays, for example, 0.1 ns or greater can also be obtained depending on the cell design parameters.

To reduce the stringency of the alignment requirements, it is possible to increase the size of the right angle mirrors 1105A and 1105B such that their segment size (the non-hypotenuse dimension) is 50 mm and to increase the size of the spherical mirror 1107 to a diameter of 75 mm. This relaxes the mechanical tolerance requirements and allows higher OPDs to be obtained with comparable distances d. An example of such layout is depicted in FIG. 11D, where a distance d=400 mm causes the transmitted pulse to be reflected 31 times and leads to an OPD of 25.30 m and a corresponding $\Delta t$=84.3 ns. The tolerances of this layout are ~1 mm and 1° (x,y), approximately. Hence, temporal delays on the order of 100 ns (and higher) are readily attainable.

As noted previously, FIGS. 11A to 11D depict a system in which a laser pulse 1101 is split by a reflective surface 1112a having an aperture. In FIGS. 11A, 11B, 11C and 11D, there are depicted four configurations of a double-pulse laser system for generating first and second laser pulses. Because the multipass cell provides a relatively long optical path length when compared with existing multipass cells, the cell effectively functions as a delay line that introduces a relatively long time delay between two laser pulses. Moreover, the geometry of the cell ensures that the light 1108 emerging from the cell is collinear with the light reflected from the exterior surface 1114 of the cell.

Figure 12A:
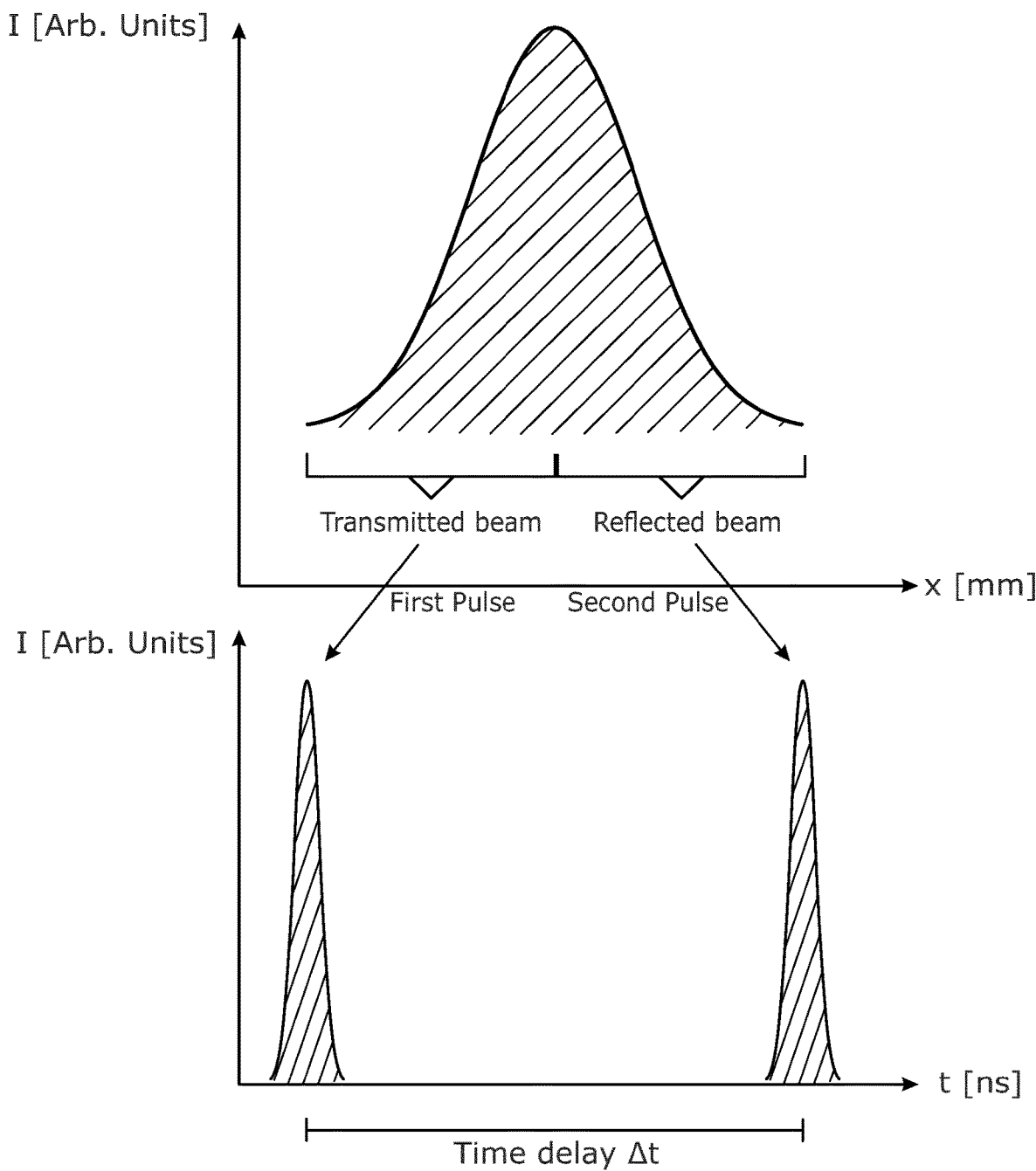
FIGS. 12A and 12B show the principle of splitting light mechanically and an optical arrangement for splitting light.

In FIG. 12A, the principle of mechanical beam splitting is depicted in further detail. The top graph represents a one-dimensional spatial section of a Gaussian laser pulse at an instant in time. The bottom graph displays the temporal profiles of two pulses formed from splitting the top pulse, which are separated by a time delay. The present disclosure proposes the use of a reflective surface to mechanically split a single pulse generated by a pulsed laser into a double (preferably collinear) set of two pulses and to be introduced a delay using a multipass cell. The transmitted portion of the pulse (i.e. the left portion of the pulse depicted in the top graph of FIG. 12A) is not subjected to any delay and is therefore positioned to the left along the temporal axis of the lower graph of FIG. 12A. A reflected pulse (i.e. the rightmost portion of the pulse depicted in the top graph) is subjected to a delay and so is positioned to the right on the temporal axis in the lower graph of FIG. 12A. Thus, it can be seen that a time delay $\Delta t$ can be introduced between two laser pulses generated by mechanically splitting a single laser pulse. Therefore, a double-pulse laser architecture can be provided.

In many applications (e.g. in double-pulse LIBS experiments), it is important that two pulses are incident on the same position (for instance, on a sample's surface). In order to verify the effectiveness of the double-pulse systems, beam profile studies can be performed, which show that when a circular aperture is used for generating the first and second laser pulses, the pulses provide a circular Gaussian profile at the point of impact with a sample. A non-circular aperture leads to a deterioration in the quality of the superimposed pulses. Hence, a circular aperture for splitting a single laser pulse is preferred when mechanical splitting is employed.

Figure 12B:
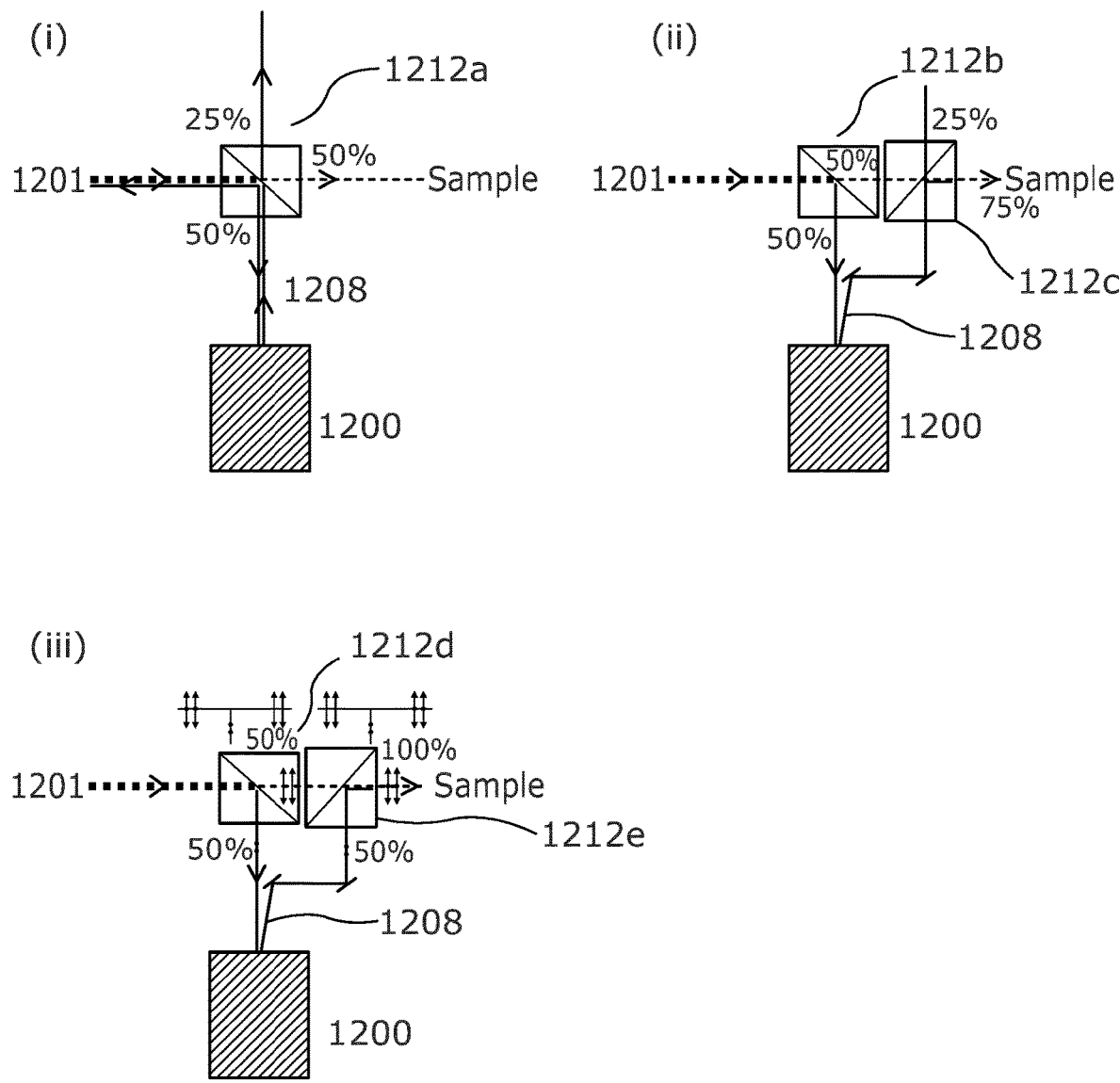

FIG. 12B shows alternative examples of multipass cells 1200 and optical arrangements 1212 for dividing laser pulses. In FIGS. 12B(i), (ii) and (iii), single laser pulses 1201 are depicted incident upon optical arrangements 1212, which comprise beamsplitters 1212a-e, for guiding light into multipass cells 1200 and towards a sample. The multipass cells 1200 of FIG. 12B may be any of them multipass cells described herein. FIG. 12B(i) depicts an optical arrangement 1212 that generates first and second laser pulses but which fails to direct both pulses towards a desired destination. FIGS. 12B(ii) and 12B(iii) depict optical arrangements 1212 that successfully generate first and second laser pulses having a relative time delay. In FIG. 12B(ii), 75% of the total energy incident in the single laser pulse is eventually directed to the sample. In FIG. 12B(iii), 100% of the total energy incident in the single laser pulse is eventually directed to the sample.

The optical arrangements 1212 of FIG. 12B utilise beamsplitters. Beamsplitters can be unpolarising (sometimes described as non-polarising) or polarising. Polarising beamsplitters split light into two beams of orthogonal polarisation states. In addition to beamsplitters, the optical arrangements 1212 also comprise reflecting elements (e.g. mirrors) for directing pulses towards the appropriate beamsplitters. Types of beamsplitter include: half-silvered mirrors; pairs of triangular prisms adhered together; Wollaston prisms; and dichroic mirrored prism assemblies (which use dichroic optical coatings).

In FIG. 12B(i), a single unpolarising beamsplitter 1212a is depicted. If a laser pulse 1201 passes through one non-polarising beamsplitter, as shown in FIG. 12B(i), then 50% is transmitted (toward the sample) and 50% is reflected. In FIG. 12B(i), this is shown as being at a 90° clockwise angle with respect to the propagation axis of the incoming pulse. The reflected part of the light passes into the multipass cell 1200 and once the pulse exits the cell 1200 along the direction of the exiting light 1208, it is incident upon the same beamsplitter 1212a again. There, 50% of this pulse (that is, 25% of the total initial pulse energy) will be reflected back towards the laser source along the direction of the incoming light 1201 (which is dangerous due to potentially damaging the source) and 50% will pass straight through the beamsplitter 1212a and will not reach the sample. This is similar to a Michelson interferometer, which relies on continuous emission to "cancel out" the part of the beam returning to the laser with destructive interference. Since FIG. 12B depicts a pulsed system with a time delay (rather than continuous waves as in a Michelson interferometer), interference does not occur. A double laser pulse is not possible using this arrangement.

FIG. 12B(ii) depicts an optical arrangement 1212 comprising two unpolarising beamsplitters 1212b and 1212c. FIG. 12B(ii) improves upon configuration (i) by adding a second beamsplitter 1212c rotated by 180° with respect to the first beamsplitter 1212b. The first beamsplitter 1212a splits a single laser pulse into first and second laser pulses. The first laser pulse passes straight through to the second beamsplitter 1212c, which the first laser pulses also passes straight through. The first laser pulse therefore travels in the direction of a sample. The second laser pulse (i.e. the delayed pulse) passes into the multipass cell 1200, traverses the cell one or more times, and emerges along the direction of the exiting light 1208, before being guided to the second beamsplitter 1212c. 50% of the second laser pulse passes straight through the second beamsplitter 1212c and 50% of the second laser pulse is directed towards the sample. In this way, back-reflection to the laser source is avoided and 75% of the original laser energy reaches the sample, with 25% of the original laser pulse energy being the second laser pulse having a temporal delay with respect to the first laser pulse. This is not an optimum scenario due to the loss of 25% of the laser energy.

FIG. 12B(iii) depicts an optical arrangement 1212 comprising two polarising beamsplitters 1212d and 1212e. The first beamsplitter 1212e splits the pulse according to its polarisation. Therefore, if circularly polarised light hits the beamsplitter 1212e, the horizontal and the vertical components are separated. Each component corresponds to 50% of the pulse energy as the original pulse is circularly polarised. Hence, 50% of the pulse is transmitted toward the sample and 50% is reflected to the multipass cell 1200. To avoid the same scenario as in Figure (i), a second polarised beamsplitter 1212e (rotated by 180° with respect to the first polarised beamsplitter 1212d) causes the two pulses to be targeted toward the sample. The advantage of this scenario is that 100% of the incident laser light is conserved, leading to increased efficiency with respect to FIG. 12B(ii).

Hence, in generalised terms, the present disclosure provides embodiments in which an optical arrangement is configured to direct the second laser pulse into the multipass cell. The optical arrangement is preferably configured to generate the first and second laser pulses from a single laser pulse (e.g. by splitting a single pulse into two). The disclosure provides arrangements for generating first and second laser pulses with a temporal delay, with the degree of the temporal delay depending upon and being controllable by the characteristics (e.g. the optical path length) of the multipass cell that is used. The optical arrangements of the present disclosure may comprise one or a plurality of unpolarising beamsplitters. Additionally or alternatively, the optical arrangement may comprise one or a plurality of polarising beamsplitters. The light may be polarised or unpolarised depending on the combination of beamsplitters that is employed. Such arrangements are advantageous in that they do not require particularly strict alignment between the laser light and the optical cavity. Moreover, they can be fabricated efficiently and effectively.

Alternatively, in generalised terms, the optical arrangement may comprise an optical splitting device for generating the first and second laser pulses by splitting a single laser pulse. This splitting may be performed mechanically. The optical splitting device may be attached to or integral with the multipass cell. For example, the optical splitting device may be on an exterior surface of the multipass cell. The multipass cell may comprise first and second reflector arrangements defining an optical cavity, and the optical splitting device may be on an exterior surface of one of the first and second reflector arrangements.

The optical splitting device may comprise a reflective surface having an aperture through which at least a portion of a laser pulse can pass. The reflective surface of the optical splitting device may be substantially planar. When prisms are used for the first reflector arrangement, it is straightforward to affix a reflective surface to the rear side, facilitating easy manufacturing of the advantageous devices disclosed herein. The aperture of the optical splitting device may be positioned centrally or substantially centrally (e.g. closer to the centre than the edge) on the reflective surface. The centre of the reflective surface may coincide with the aperture. Thus, when prisms are used, the splitting device may allow half of the light through a slit between the prisms and into the cell, whilst diverting the other half of the light away from the cell. The aperture of the optical splitting device is preferably circular. Circular apertures allow the subsequent laser pulses to exhibit a high degree of spatial coherence. The aperture of the optical splitting device is preferably aligned with an aperture of the multipass cell (e.g. the aperture for allowing light into the cell).

Hence, in generalised terms, the optical arrangement is preferably configured to direct a single laser pulse towards the aperture of the optical splitting device such that a portion of the single laser pulse passes through the aperture of the optical splitting device and into the multipass cell, thereby generating the second laser pulse, and a portion of the single laser pulse is reflected by the reflective surface of the optical splitting device, thereby generating the first laser pulse. This allows a high proportion of the energy of the light to be conserved, as minimal energy is lost when light reflects from a reflective surface or when light passes through an aperture. Thus, such an arrangement is highly efficient. Moreover, two pulses are generated and a temporal delay between the pulses can readily be applied (which may be adjustable) to the pulse that enters the cell. The optical arrangement may be configured to direct the single laser pulse towards the edge of the aperture such that half of the light passes therethrough.

Figure 13:
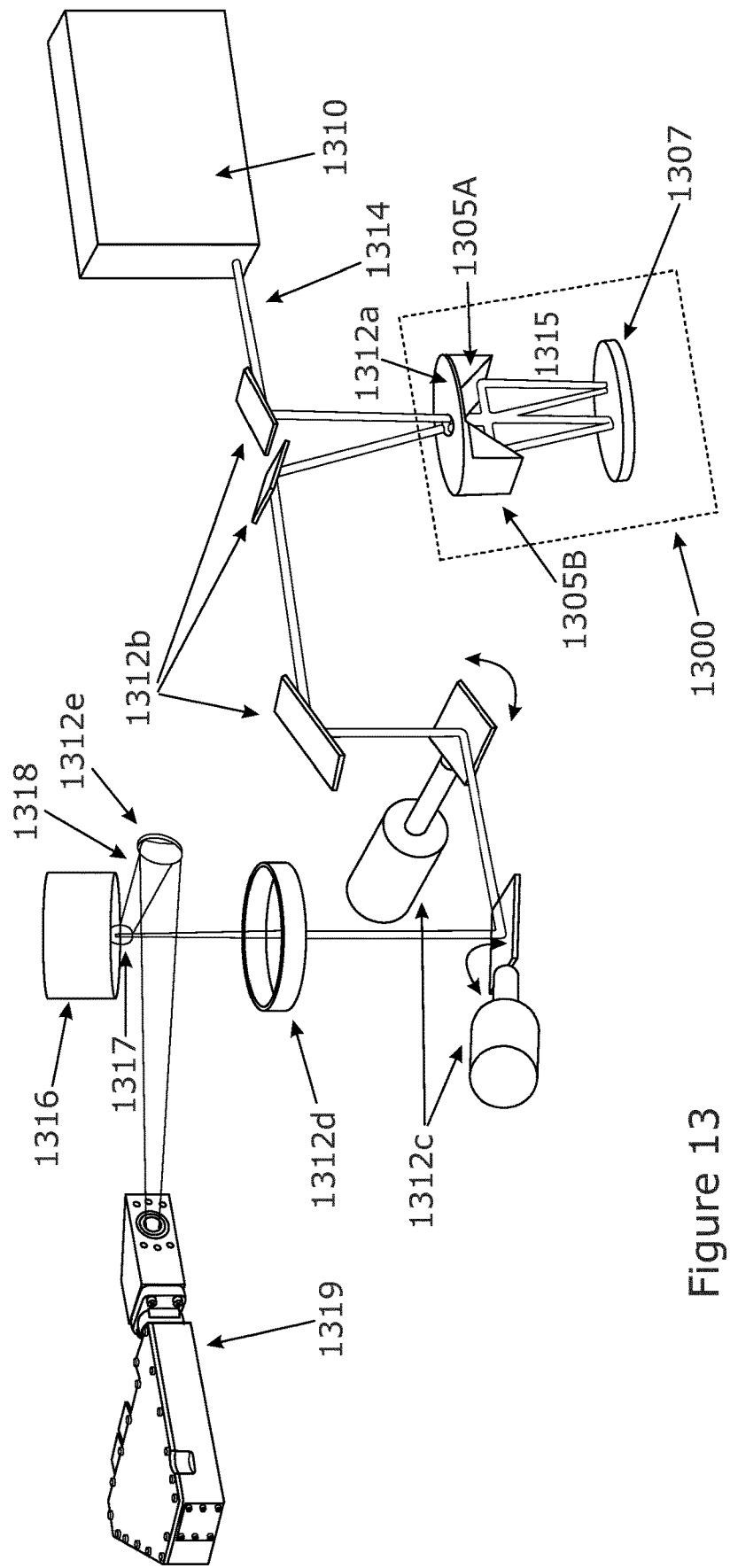
FIG. 13 shows schematically a double-pulse laser-induced breakdown spectrometer utilising the multipass cells described herein.

In FIG. 13, there is depicted a double-pulse laser-induced breakdown spectrometry system that operates according to the principles described previously. The LIBS system of FIG. 13 uses a double-pulse laser system such as that depicted in FIGS. 11A to 11D. The system of FIG. 13 comprises a cell 1300, which may be any cell described previously, and which comprises a first reflector arrangement 1305 comprising two prisms 1305A and 1305B and a spherical mirror 1307 defining a cavity 1315.

The system comprises a laser source 1310, which is capable of emitting a single laser pulse 1314. The system also comprises an optical arrangement 1312, which comprises a number of optical elements 1312b-d for guiding light to the cell 1300 and then from the cell 1300 to a sample 1316. The optical arrangement is also configured to generate first and second laser pulses from the single laser pulse 1314 by virtue of an optical splitting device 1312a, which is a reflective surface having an aperture on the first reflector arrangement 1305 of the cell 1300. The optical splitting device 1312a is integrally formed with the first reflector arrangement 1305 of the cell 1300. The optical arrangement 1312 also comprises rotatable mirrors 1312c and lens 1312d for guiding and focusing laser pulses from the cell 1300 to a sample 1316.

It can be seen in FIG. 13 that when a laser pulse 1314 is emitted by the laser source 1310, it is guided by a mirror of the optical arrangement 1312b to the cell 1300. As described previously, part of the single pulse 1314 is reflected by the optical splitting device 1312a to form a first laser pulse and part of the single pulse 1314 passes into the cavity 1315 of the cell 1300 to be delayed with respect to the first pulse, thereby forming a second laser pulse.

Once the first and second pulses are respectively reflected from the splitting device 1312a and emerge from the cell 1300, they are guided by further mirrors of the optical arrangement 1312b to rotatable mirrors 1312c, which can fine-tune the direction of the pulses such that they are directed to the lens 1312d. The lens 1312d then focuses the pulses such that they impact a point on the sample 1316.

The first laser pulse impacts the sample 1316 and generates a plasma 1317 from the surface of the sample 1316 and the second laser pulse then impacts the plasma 1317 to increase its temperature and additionally impacts the surface to generate further plasma. The first and second pulses thus cause the generation of the plasma 1317 and the subsequent emission of plasma light 1318 from the plasma 1317. The plasma light is reflected by a mirror 1312e that is positioned near the sample. The mirror 1312e guides the plasma light to a detector (e.g. a spectrograph) 1319 for analysis of the emissions. The mirror 1317 may be considered to be part of the optical arrangement 1312 or may be a separate optical arrangement.

In the specific example depicted in FIG. 13, the mirrors 1312c are Galvo mirrors (e.g. of a motorised dual-axis galvo system that allows scanning of the position of the laser pulses across the surface in two dimensions, for example to enable surface mapping of the sample) and the lens 1312d is an f-theta lens. However, other types of adjustable mirror and focusing elements may be used. Furthermore, any number of mirrors and/or lenses can be used within the optical arrangement 1312 and additional plasma mirrors 1312e may be used (e.g. to direct emitted light 1318 from the plasma to one or more further detectors, which may be a different type to the detector 1319). Moreover, the optical splitting device 1312a of the optical arrangement 1312 may be replaced by a beamsplitter arrangement, such as the arrangement depicted in FIG. 12B.

Thus, it can be seen that the disclosure provides, in general terms, a double-pulse laser-induced breakdown spectrometer for analysing a sample by causing first and second laser pulses to impact the sample, wherein the spectrometer comprises any of the previously-described double-pulse laser systems for generating the first and second laser pulses; and a detector for detecting light emitted by the sample.

As noted previously, the angle at which light enters the multipass cells of this disclosure can be used to control the number of times light traverses the reflector arrangements of the cell and hence the optical path length. Thus, in the described embodiments, the light source may be capable of changing the direction at which light enters the cell (e.g. by being rotatable or by being rotatably mounted). Alternatively, further optical elements (e.g. adjustable mirrors) may be provided to allow the angle of light entering the cell to be varied. The optical arrangement may be configured to guide the first and second laser pulses to the sample along collinear paths. The detector can be any type of detector, including a spectrograph, a photodiode, a charge-coupled device (CCD), a complementary metal-oxide-semiconductor (CMOS) camera, an intensified charge-coupled device (ICCD), an electron multiplying CCD, or one or more microchannel plate detectors.

Hence, in generalised terms, the systems of the present disclosure may comprise: any of the multipass cells described previously; wherein the optical arrangement is configured such that the angle at which light is directed into the multipass cell is adjustable. The angle may be defined relative to an axis defined by the multipass cell (e.g. a longitudinal axis, such as the axis extending between the centres of the first and second reflector arrangements). The angle between the direction in which light is directed into the multipass cell and the axis defined by the multipass cell may be: from 0° to 20°; from 1° to 15°; or from 2° to 10°. If an aperture of the cell are perpendicular to the axis defined by the cell, then the angle at which light enters the cell may instead be expressed as relative to the normal to the aperture, because in such a case the normal to the aperture would be parallel to the longitudinal axis of the cell.

The provision of an adjustable angle allows the optical path length to be controlled whilst retaining a stable configuration and the advantages associated with such stability. Such optical arrangements can be provided independently of a detector or a light source. In other words, the optical arrangements and the multipass cells of the disclosure can be provided together, for use with any detector and/or light source. The optical elements may be affixed to the multipass cell (e.g. attached to the outside of the cell) or formed integrally with the cell housing.

The system for generating double laser pulses in the LIBS systems described previously may be used in any scenario in which multiple laser pulses are required. Therefore, the disclosure also provides a double-pulse laser system for generating first and second laser pulses, the system comprising any of the multipass cells described herein arranged to delay the second laser pulse with respect to the first laser pulse. The optical arrangement may be configured to: generate the first and second laser pulses from a single laser pulse; and direct the second laser pulse into the multipass cell so as to delay the second laser pulse with respect to the first laser pulse. The optical arrangement may comprise any of the previously-described mechanisms for generating first and second laser pulses, including: an optical splitting device for generating the first and second laser pulses by splitting a single laser pulse (e.g. using a reflective surface having an aperture); and/or one or a plurality of unpolarising beamsplitters for generating the first and second laser pulses; and/or one or a plurality of polarising beamsplitters for generating the first and second laser pulses.

Figure 14:
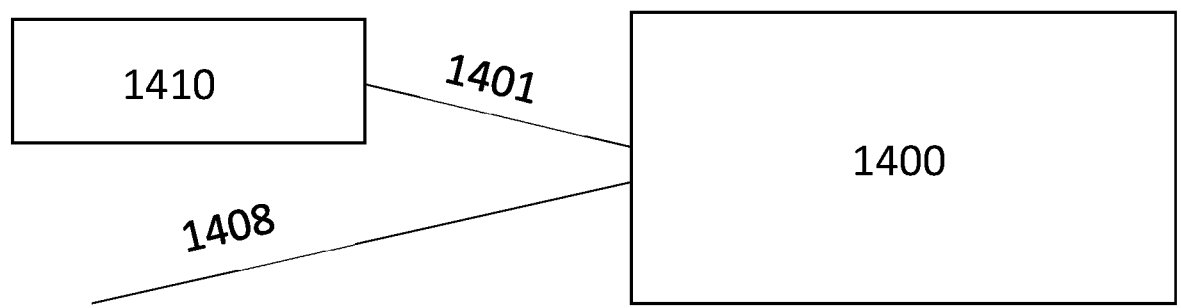
FIG. 14 shows schematically a laser pre-amplifier utilising the multipass cells described herein.

The multipass cells of the present disclosure can also be used in laser fabrication. For instance, it can be shown that a multipass cell can be used as a multipass laser preamplifier. Such a laser pre-amplifier is depicted in FIG. 14. A gain medium is excited by a set of pulses, each having a pumping pulse duration of typically 1-10 nanoseconds. Gain media are typically glasses and laser crystals. Whilst pumping, energy is stored in such a gain medium for microseconds or milliseconds and then released within a very short time (on the order of femtoseconds to nanoseconds).

The laser pre-amplifier comprises a light source 1410, which directs light along a path 1401 to a multipass cell 1400, which could be any of the previously-described multipass cells. Light traverse the cell 1400 and emerges along the path 1408. It is possible to amplify light pulses using a gain jet in the femto-second regime to obtain amplification of light. For instance, the multipass cell can be used to ensure that the light from the light source 1410 passes through a gain medium repeatedly. One or more light pulses to be amplified is directed from the light source 1410 into the cell (optionally via an optical arrangement as described previously). The gain medium may be excited by pulses of light. The total degree of amplification may depend on the total number of passes within the cell 1400, so the cells of this disclosure may be particularly advantageous in such scenarios due to the surprisingly high stability exhibited for a large number of passes. In such applications, it may be advantageous to ensure that the gain medium is held close to the prisms of the cell (e.g. near the slit between the prisms in the case that the first reflector arrangement comprises an aperture), as the density of beam passes is the highest in this region.

Hence, in generalised terms, the disclosure also provides a pre-amplifier for a laser comprising: any of the multipass cells described herein; wherein: the multipass cell is configured to contain a gain medium; and the multipass cell is configured to direct light through the gain medium so as to amplify the light. A laser comprising the pre-amplifier is also provided. The cells described herein can provide long path lengths due to their stability and so are effective for use in laser fabrication.

The present disclosure also provides methods for manufacturing the systems, devices, multipass cells and optical arrangements described herein. For instance, a method for manufacturing a multipass cell may comprise providing: a first reflector arrangement; and a second reflector arrangement; wherein the first reflector arrangement is configured such that light incident on the first reflector arrangement is at least partially retroreflected towards the second reflector arrangement. The method of manufacture may further comprise providing any of the features of the multipass cell (e.g. any structural features) described herein. Methods for manufacturing the systems and devices may comprise providing any structural features described herein.

It will be appreciated that many variations may be made to the above apparatus and methods whilst retaining the advantages noted previously. For example, whilst the above embodiments have been described mainly with reference to planar reflective surfaces in the context of providing retroreflective or partially retroreflective surfaces, it will be understood that any material exhibiting retroreflectivity may be used. Moreover, any reflecting surface in this disclosure may be fully reflective or partially reflective.

The disclosure has been described with reference to generic lasers and it will be appreciated that any laser can be used with the systems and cells described herein. For instance, whilst a tuneable diode laser is preferred, any solid-state, gas, liquid, chemical, metal-vapour, dye or semiconductor laser may be used. Other preferred examples include Nd:YAG lasers, CO2 lasers, Excimer lasers and Ruby lasers.

It will also be understood that although the disclosure has been described with reference to particular types of devices and applications, and whilst the disclosure provides particular advantages in such cases, as discussed herein the disclosure may be applied to other types of devices and applications. For instance, the multipass cells of this disclosure may be employed in any scenario in which precise control over the optical path length of light is required.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as a laser pulse or a reflector) means "one or more" (for instance, one or more laser pulses, or one or more reflectors). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed. For instance, if a laser pulse is described as being reflected from a first surface to a second surface, this does not preclude the laser pulse being reflected by additional surfaces before reaching the second surface.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

The invention claimed is:

1. A multipass cell comprising:
   a first reflector arrangement; and
   a second reflector arrangement, the first and second reflector arrangements defining an optical cavity therebetween and the cell;
   wherein the first reflector arrangement is configured such that light incident on the first reflector arrangement is at least partially retroreflected towards the second reflector arrangement, wherein the second reflector arrangement comprises a concave surface that is reflective, wherein the first reflector arrangement comprises an aperture for allowing light to enter and exit the optical cavity.

2. The multipass cell of claim 1, wherein the first reflector arrangement comprises first and second surfaces that are reflective.

3. The multipass cell of claim 2, wherein the first reflector arrangement is configured such that light incident thereon is reflected from the first surface to the second surface, and to the second reflector arrangement.

4. The multipass cell of claim 2, wherein the first and second surfaces are substantially perpendicular.

5. The multipass cell of claim 2, wherein the first and second surfaces are substantially planar.

6. The multipass cell of claim 5, wherein:
   the planes of the first and second surfaces define a common axis; and
   the first reflector arrangement is retroreflective for light incident perpendicular to the common axis.

7. The multipass cell of claim 2, wherein the first reflector arrangement comprises first and second prisms and the first and second surfaces are faces of the first and second prisms respectively, wherein the cross-sections of the prisms are right-angled isosceles triangles.

8. The multipass cell of claim 7, wherein the first reflector arrangement comprises a mounting structure configured to mount the first and second prisms such that the first and second surfaces are substantially perpendicular.

9. The multipass cell of claim 2, wherein the first reflector arrangement comprises a third surface that is reflective, wherein the first, second and third surfaces are substantially mutually perpendicular.

10. The multipass cell of claim 1, wherein the second reflector arrangement is configured such that light incident thereon is reflected towards the first reflector arrangement.

11. The multipass cell of claim 1, wherein the second reflector arrangement is configured such that light incident thereon is focused towards the first reflector arrangement.

12. The multipass cell of claim 1, wherein the concave surface is an ellipsoidal surface, a spheroidal surface, or a spherical surface.

13. The multipass cell of claim 1, wherein the size of the aperture of the first reflector arrangement is adjustable.

14. The multipass cell of claim 1, wherein the first reflector arrangement comprises first and second prisms and a slit between the edges of the first and second prisms defines the aperture of the first reflector arrangement.

15. The multipass cell of claim 1, wherein the first reflector arrangement comprises first, second and third surfaces and the aperture is at a corner of the first, second and third surfaces.

16. The multipass cell of claim 1, further comprising a housing for containing a gaseous sample, wherein the first and second reflector arrangements are within the housing.

17. The multipass cell of claim 16, wherein the housing comprises an optical window for allowing light into the multipass cell.

18. The multipass cell of claim 1, further comprising an inlet and/or an outlet for a gaseous sample.

19. The multipass cell of claim 1, wherein the separation between the first and second reflector arrangements is adjustable.

20. The multipass cell of claim 1, wherein the multipass cell is configured such that the optical path length traversed by light is adjustable.

21. A system comprising:
the multipass cell of claim 1; and
an optical arrangement configured to direct light into the multipass cell.

22. The system of claim 21, wherein the optical arrangement is configured such that the angle at which light is directed into the multipass cell is adjustable.

23. The system of claim 22, wherein the multipass cell has a longitudinal axis, wherein the optical arrangement is configured to direct the second laser pulse into the multipass cell at an angle to the longitudinal axis of:
from 0° to 20°;
from 1° to 15°; or
from 2° to 10°.

24. The system of claim 21, wherein the optical arrangement is configured to direct light into the multipass cell at an angle to cause the light to be reflected back and forth multiple times between the first and second reflector arrangements.

25. The system of claim 21, further comprising a light source configured to direct light towards the optical arrangement.

26. The system of claim 21, further comprising a detector configured to detect light from the multipass cell.

27. The system of claim 26, wherein the optical arrangement is further configured to direct light from the multipass cell to the detector.

28. An absorption spectrometer comprising:
the system of claim 21.

29. A pre-amplifier for a laser comprising:
the system of claim 21; wherein:
the multipass cell is configured to contain a gain medium; and
the multipass cell is configured to direct light through the gain medium so as to amplify the light.

30. An absorption spectrometer comprising:
the multipass cell of claim 1.

31. A pre-amplifier for a laser comprising:
the multipass cell of claim 1; wherein:
the multipass cell is configured to contain a gain medium; and
the multipass cell is configured to direct light through the gain medium so as to amplify the light.

32. A laser comprising the pre-amplifier of claim 31.

* * * * *